(12) United States Patent
Roenning

(10) Patent No.: US 9,431,057 B2
(45) Date of Patent: Aug. 30, 2016

(54) MEDIA PRODUCTION APPLICATION

(71) Applicant: Apple Inc., Cupertino, CA (US)

(72) Inventor: Jeff Roenning, Santa Cruz, CA (US)

(73) Assignee: APPLE INC., Cupertino, CA (US)

( * ) Notice: Subject to any disclaimer, the term of this patent is extended or adjusted under 35 U.S.C. 154(b) by 73 days.

(21) Appl. No.: 14/070,436

(22) Filed: Nov. 1, 2013

(65) Prior Publication Data

US 2014/0129943 A1 May 8, 2014

Related U.S. Application Data

(63) Continuation of application No. 12/816,346, filed on Jun. 15, 2010, now Pat. No. 8,583,605.

(51) Int. Cl.
*G06F 17/30* (2006.01)
*G11B 27/031* (2006.01)
*G06F 3/0481* (2013.01)

(52) U.S. Cl.
CPC ......... *G11B 27/031* (2013.01); *G06F 3/04817* (2013.01); *G06F 17/30041* (2013.01); *G06F 17/30044* (2013.01); *G06F 17/30781* (2013.01)

(58) Field of Classification Search
USPC ................ 707/607, 609, 687, 705, 790, 821
See application file for complete search history.

(56) References Cited

U.S. PATENT DOCUMENTS

| | | |
|---|---|---|
| 5,806,079 A | 9/1998 | Rivette et al. |
| 6,282,362 B1 | 8/2001 | Murphy et al. |
| 6,389,434 B1 | 5/2002 | Rivette et al. |
| 6,628,303 B1 | 9/2003 | Foreman et al. |
| 7,356,242 B2 | 4/2008 | Nagasawa |
| 7,518,650 B2 | 4/2009 | Miyamoto |
| 8,132,103 B1* | 3/2012 | Chowdhury ...... G06F 17/30056 715/720 |
| 8,583,605 B2 | 11/2013 | Roenning |
| 2005/0021754 A1* | 1/2005 | Alda .............. G06F 21/10 709/225 |
| 2005/0066317 A1* | 3/2005 | Alda .............. G06F 21/10 717/136 |
| 2006/0187317 A1 | 8/2006 | Montulli et al. |
| 2007/0115373 A1 | 5/2007 | Gallagher et al. |
| 2007/0118801 A1* | 5/2007 | Harshbarger ........ G11B 27/031 715/730 |
| 2007/0162340 A1* | 7/2007 | Spinoso .............. G06Q 30/02 705/14.14 |
| 2007/0206101 A1 | 9/2007 | Ueno et al. |
| 2007/0284450 A1 | 12/2007 | Nelson |
| 2008/0040359 A1 | 2/2008 | Arrouye et al. |
| 2008/0117309 A1 | 5/2008 | Jeon |
| 2008/0208906 A1 | 8/2008 | Penner |
| 2009/0037477 A1* | 2/2009 | Choi .............. G06F 17/30259 |
| 2009/0094039 A1 | 4/2009 | MacDonald et al. |
| 2012/0101869 A1* | 4/2012 | Manganelli et al. ....... 705/7.23 |

* cited by examiner

*Primary Examiner* — Sana Al Hashemi
(74) *Attorney, Agent, or Firm* — Adeli LLP

(57) ABSTRACT

Some embodiments provide a media production application. The application receives a script of a media project and parses the script to identify (i) story sections of the media project and (ii) characters in the media project. The application automatically creates data structures for the story sections and the characters, and associations between the story sections and the characters. The application receives several different types of data related to production of a media project and automatically schedules production activities for the media project based on the different types of data. For each location at which one or more story sections will be filmed, the application receives a photo of the location. The application displays a graphical outline of the media project in which each story section is represented by a thumbnail of the photo of the location at which the story section will be filmed.

20 Claims, 31 Drawing Sheets

MEDIA PRODUCTION APPLICATION

CLAIM OF BENEFIT TO PRIOR APPLICATIONS

This Application is a continuation application of U.S. patent application Ser. No. 12/816,346, filed Jun. 15, 2010, entitled "Media Production Application," now published as U.S. Publication 2011/0307527. U.S. patent application Ser. No. 12/816,346, now published as U.S. Publication 2011/0307527 is incorporated herein by reference.

BACKGROUND

Most media pre-production activities today are performed almost entirely manually. A producer, director, etc. of a movie will acquire blocks of sticky notes prior to beginning pre-production on the movie, and use these sticky notes to keep track of the story and other data. Location photographs are tacked up along with the sticky notes, information about filming locations is manually looked up on the Internet and printed out, and one or more people involved in the movie production have to handle the time-intensive process of trying to schedule all of the filming activities.

In addition, reports such as cost analysis and actor schedules must be generated through entering a myriad of data into spreadsheets. Daily production reports are manually typed out on a daily basis. Ideally, much of this pre-production and production activity could be computerized, such that information can be stored in an organized fashion and used to streamline the pre-production and production process.

BRIEF SUMMARY

Some embodiments of the invention provide a novel application for organization of the production of a media project (e.g., film, episode of a television show, etc.). The application receives data about the media project and uses this data to assist in the production of the media project. In some embodiments, the data about the media project includes hierarchical story data (e.g., acts, scenes, etc.) as well as non-hierarchical data (e.g., information about characters, cast and crew, etc.). This data is used by the media production application of some embodiments to produce an outline of the story, schedule production activities, etc.

Some embodiments receive initial data about a media project by importing and parsing a script of the media project. By parsing the script, the application can identify the scenes (and possibly other aspects of the story hierarchy) and characters of the media project and create data structures for each of these entities. Some embodiments create references in the data structures between, for example, a character and each of the scenes in which the character is featured in the media project.

The media production application also receives additional data about the media project and its production from various sources. For instance, some data is manually entered by a user (e.g., a cast and crew list, which cast member will be playing which character, a list of filming locations, etc.). The data may also include information for cast members, crew, and locations that indicates dates and times that the people or places are available.

Some embodiments include a secondary application that operates on a portable device that can capture photographs and that includes a geolocation data receiver (e.g., GPS receiver), such as a smartphone. When the portable device captures a photo, the photo is tagged with geolocation data. In addition, the secondary application allows a user to enter a name of a filming location with which the photo is also tagged, thereby associating the geolocation data with the filming location. The secondary application uploads the photos with the location metadata to the main media production application.

In addition, one or both of the main production application and the portable secondary application will automatically search for information about the filming locations using the geolocation information in some embodiments. The application uses the geolocation information to perform an Internet search and retrieve data about the filming location. In some embodiments, this data may include fire and rescue information, food and hotel information, maps of the area, etc.

Once the media production application has accumulated all of the data and created associations between the data (e.g., associating actors with characters, locations with scenes, props with scenes, etc.), the application of some embodiments may be used to assist in production of the media project in various ways. For instance, the media production application will create a visual outline of the media project and can generate various production-related reports in some embodiments.

Some embodiments generate a visual outline by identifying a photo for each section of the story (e.g., each scene) and arranging these photos into an outline or storyboard. The photo for a particular section may be a photo associated with the location at which that section will be filmed. In addition to the photo, other information such as the location, the scene number, the characters featured in the story section, etc. may be included in the visual outline.

The media production application may also perform scheduling of production activities (e.g., filming). Some embodiments use the data for times at which the various cast members and filming locations are available to automatically generate a filming schedule for the media project. The application can identify conflicts (e.g., if not all of the actors in a scene are available on the same day) and report these to the user. The media production application can also produce various other reports such as daily production reports using the schedule and other data stored about the media production application.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details are set forth for purpose of explanation. However, one of ordinary skill in the art will realize that the invention may be practiced without the use of these specific details.

Some embodiments of the invention provide a novel application for organization of the production of a media project (e.g., film, episode of a television show, etc.). The application receives data about the media project and uses this data to assist in the production of the media project. In some embodiments, the data about the media project includes hierarchical story data (e.g., acts, scenes, etc.) as well as non-hierarchical data (e.g., information about characters, cast and crew, etc.). This data is used by the media production application of some embodiments to produce an outline of the story, schedule production activities, etc.

Figure 1:
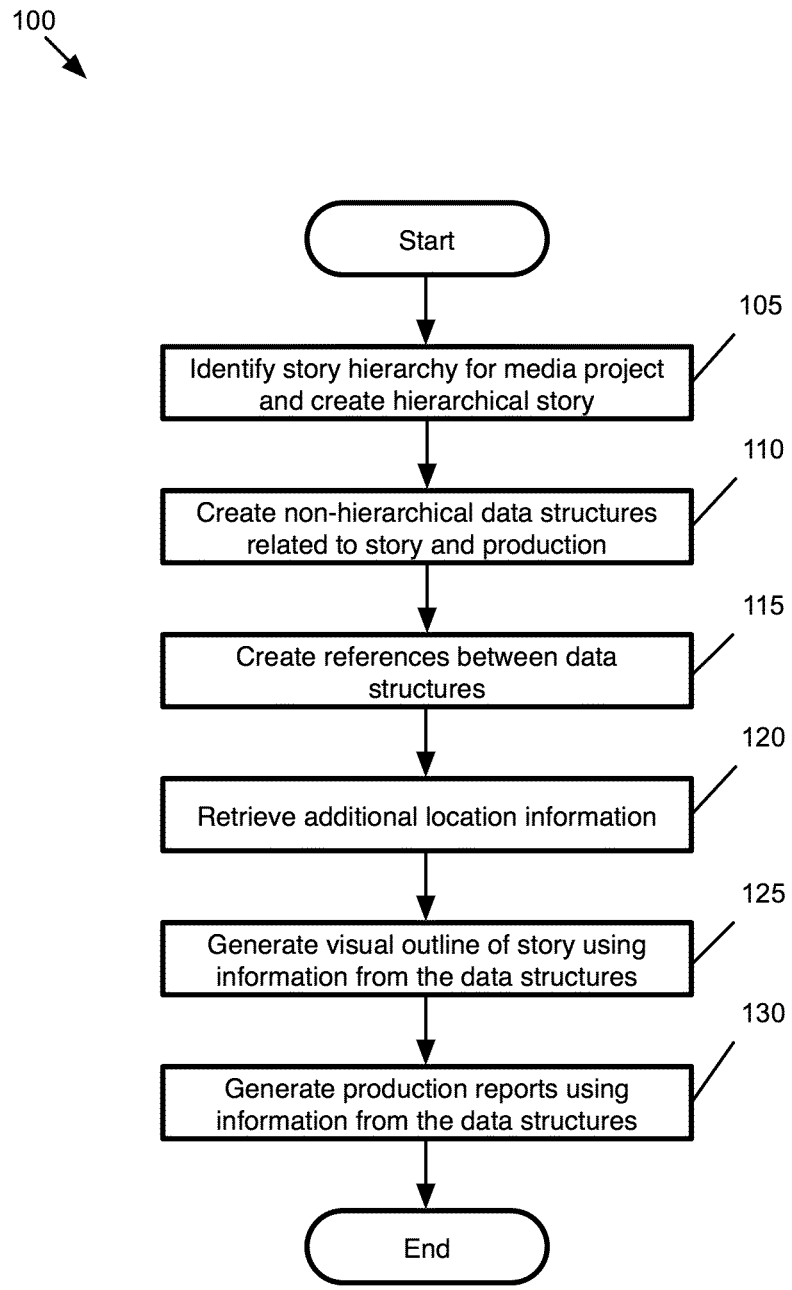
FIG. 1 conceptually illustrates a process of some embodiments performed by a media production application.

FIG. 1 conceptually illustrates a process 100 of some embodiments performed by the media production application. As shown, the process 100 begins by identifying (at 105) a story hierarchy for the media project and creating hierarchical story data. In some embodiments, the application receives a script and parses the script to identify the story hierarchy (e.g., scenes, and possibly acts). Some embodiments create a data structure for each scene, act, etc. The data structure for a particular scene includes a reference to the data structure for the act of which the scene is a part.

The process also creates (at 110) non-hierarchical data structures related to the story and production. When a script is imported, some embodiments also identify the characters of the media project. Some data is manually entered into the application by a user (e.g., a director, editor, etc. of the media project). This data may include a cast and crew list, information regarding which cast member is playing which character, a list of filming locations, a list of props, costs for the cast members, props, and locations, etc. The data may also include information that indicates dates and times that the people or places are available.

In addition, some embodiments include a secondary application that operates on a portable device that can capture photographs and that includes a geolocation data receiver (e.g., GPS receiver), such as a smartphone. When the portable device captures a photo, the photo is tagged with geolocation data. In addition, the secondary application allows a user to enter a name of a filming location with which the photo is also tagged, thereby associating the geolocation data with the filming location. The secondary application uploads the photos with the location metadata to the main media production application.

Data structures are created for certain entities in some embodiments, such as the characters, cast members, locations, props, etc. Information about each entity may be stored within the data structure. For instance, the data structure for a cast member will indicate, among other information, the times the cast member is available.

The process also creates (at 115) references between the data structures. In some embodiments, when a script is imported, the data structure for a character is associated with the data structure for each scene featuring the character. Some embodiments create bidirectional references, such that the data structure for each scene includes references to each character in the scene. References are also created to indicate which scenes are filmed at various locations, which props are needed for which scenes, etc.

Next, the process retrieves (at 120) additional location information. In some embodiments, one or both of the main production application and the portable secondary application will automatically search for information about the filming locations using the geolocation information. The application uses the geolocation information to perform an Internet search and retrieve data about the filming location. In some embodiments, this data may include fire and rescue information, hotel and food information, maps of the area, etc. Some embodiments store retrieved information for a particular location within the data structure for the particular location.

The process 100 then generates (at 125) a visual outline of the story using the data structures. Some embodiments generate a visual outline by identifying a photo for each section of the story (e.g., each scene) and arranging these photos into an outline or storyboard. The photo for a particular section may be a photo associated with the location at which that section will be filmed. In addition to the photo, other information such as the location, the scene number, the characters featured in the story section, etc. may be included in the visual outline. The items in the visual outline may be selectable in some embodiments so that a user can modify the story (e.g., move scenes around) or access details about a particular section of the story (e.g., a scheduled filming time, the script for the scene, etc.).

The process 100 also generates (at 130) production reports using the information from the data structures. In order to generate many of these reports, the media production application performs scheduling of production activities (e.g., filming). Some embodiments use the data for times at which the various cast members and filming locations are available to automatically generate a filming schedule for the media project. The application can identify conflicts (e.g., if not all of the actors in a scene are available on the same day) and report these to the user. With this schedule, various reports such as daily production reports, actor schedules, etc. can be automatically generated by the media production application.

Several more detailed embodiments of the invention are described below. Section I describes in further detail various methods by which the media production application accumulates data. Section II then describes the visual outline generated by the media production application of some embodiments. Section III describes the scheduling feature of some embodiments and the generation of various reports. Section IV describes the software architecture of a media production application of some embodiments, while Section V follows that with a description of a process used to define and store the application. Finally, Section VI describes an electronic system with which some embodiments of the invention are implemented.

I. Entering Data into Media Production Application

The media production application of some embodiments uses data structures to represent various aspects of a media production and the relationships between those aspects. These data structures are created in response to various different sorts of input in some embodiments. For instance, scripts may be imported to generate an initial story hierarchy and cast of characters. A user with a portable device may take photos of various locations at which the media production will be filmed and associate the photos with the locations. Based on data about the location (e.g., geolocation data, an address, etc.), the media production application will automatically search Internet sources for information (e.g., fire and rescue, hotels, food, etc.) about the location. Additionally, information can be manually entered by a user (e.g., actor and crew information, prop information, etc.).

A. Script Import

As mentioned above, some embodiments automatically generate at least a partial story hierarchy for a media production (e.g., film, television production, etc.) from an imported script. The imported script, in many cases, will also enable the automatic generation of a list of characters for the media production. From the script, initial data structures for story sections (e.g., scenes) and characters may be generated, along with associations between the data structures (i.e., matching characters with their scenes).

Figure 2:
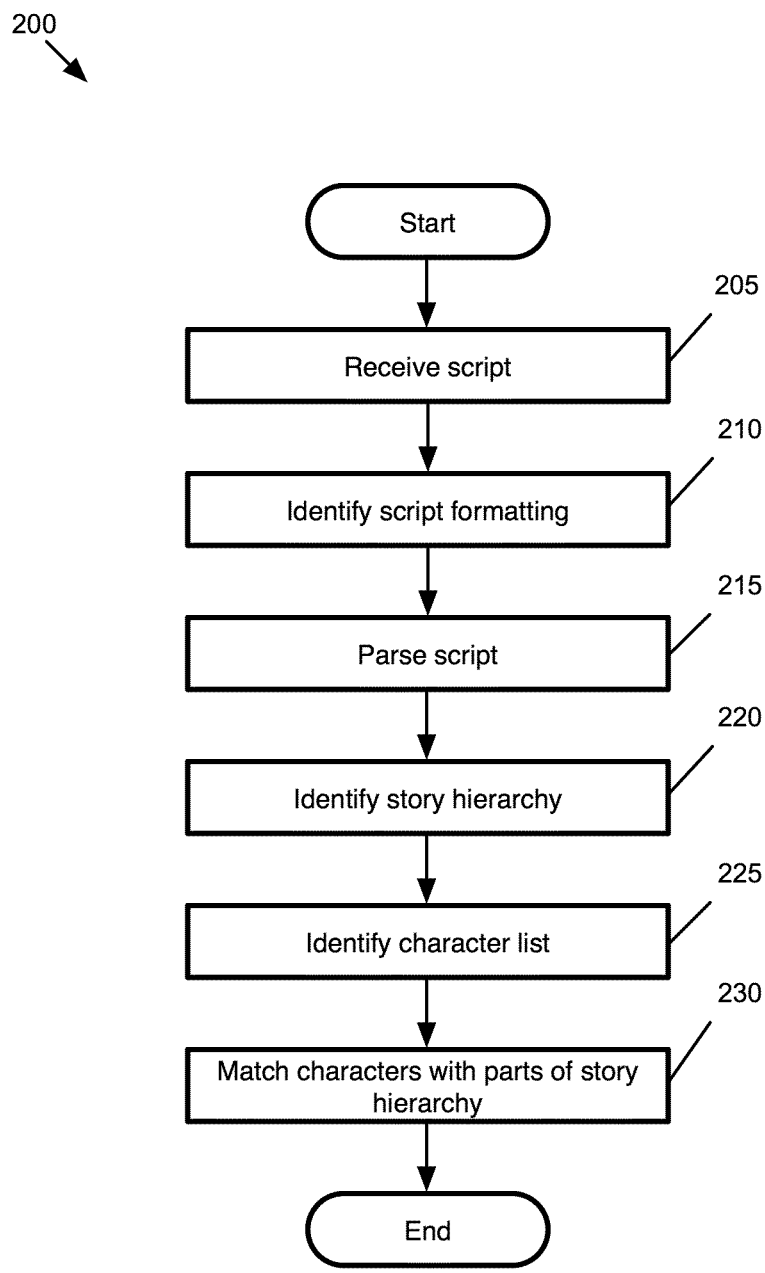
FIG. 2 conceptually illustrates a process of some embodiments for importing a script and generating story data from the script.
Figure 3:
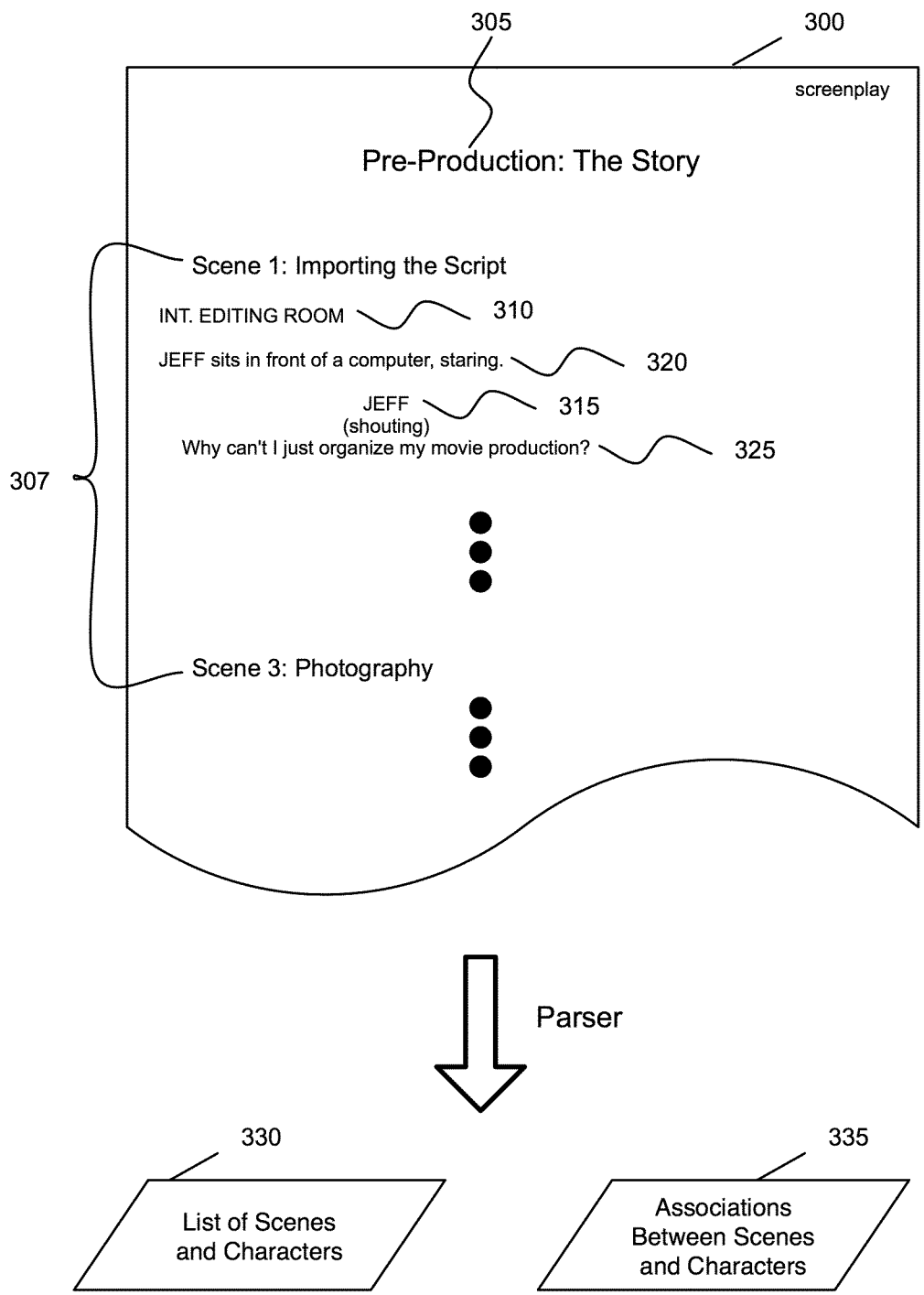
FIG. 3 illustrates a script that is sent to a parser that generates data structures and associations between the data structures.

FIG. 2 conceptually illustrates a process 200 of some embodiments for importing a script and generating story data from the script. In some embodiments, process 200 is performed by a particular module of the media production organization application. Process 200 will be described by reference to FIG. 3 and FIG. 4. FIG. 3 illustrates a script that is sent to a parser that generates data structures and associations between the data structures, while FIG. 4 conceptually illustrates the data structures of some embodiments in more detail.

As shown, the process 200 begins by receiving (at 205) a script. In some embodiments, the script is stored as a text file, XML file, or similar file type (e.g., a file type specific to a particular screenwriting tool that is similar to a text file or XML file). Through a user interface of the media production application, a user creates a new media project and selects a script (e.g., stored in a memory of the computer on which the media production application is operating) for the project.

The process then identifies (at 210) the formatting of the script. In some embodiments, a limited number (e.g., five) of script formats are recognized by the media production application. These recognized script formats are those that are regularly used by screenwriters. For instance, many screenwriters use a tool such as Final Draft® that formats scripts in a particular manner, as opposed to self-formatting a script in a word processing application. Some embodiments are able to read all standardized formats from various screenwriting applications.

In order to identify the formatting, some embodiments look at the file extension of the imported script file (e.g., .fdr or .fdx for Final Draft® files). Some screenwriting tools will format a script in a particular way, and thus a file extension indicating that the script was produced using a particular tool will indicate the formatting. Some embodiments try to match the script against the various recognizable formats until the formatting is identified. When the script format cannot be identified, some embodiments generate an error to notify the user that the script is not readable. Other embodiments, however, will attempt to parse the script even if the format cannot be identified.

The format of a script will determine how different items appear in the script. For instance, scripts should include scene headers, characters, actions, settings, and dialogue. FIG. 3 illustrates one appearance of a script 300. As mentioned, some scripts will be imported as XML files. In this case, various tags will be present in the file such that an application with the ability to read the script would display the script in the manner shown in FIG. 3. Some embodiments of the media production application can identify one script format from another based on the tags present in the script file.

Once the formatting is identified, the process 200 parses (at 215) the script. In parsing the script, the media production application classifies various portions of the script. For instance, FIG. 3 illustrates an example of a portion of a script 300. The illustrated portion of the script 300 includes a title 305 ("Pre-Production: The Story"), scene headers 307, a setting 310 (editing room, an interior), a character 315 ("Jeff"), an action 320 ("Jeff sits in front of a computer, staring"), and dialogue 325 ("Why can't I just organize my movie production?", said by Jeff).

Some embodiments parse each word in the script and classify the word into one of the above categories (title, scene header, setting, character, action, dialogue). Some embodiments include other categories as well. The process uses formatting (e.g., all caps for characters, indentations and/or larger font for scene headers, etc.) and keywords ("Scene" to indicate a scene header, "INT." to indicate an interior setting, etc.) to differentiate between categories in some embodiments.

In addition, when the script is an XML document, some embodiments use the XML tags to differentiate between categories. For example, the line "JEFF sits in front of a computer, staring" might appear in the script XML file as "<action><char>Jeff</char>sits in front of a computer, staring.</action>". The parser of some embodiments identifies the action and character tags and therefore identifies "Jeff" as a character and the line as an action. One of ordinary skill will recognize that the example given is merely one possible set of tags for an XML file, and that many other permutations are possible.

Based on the parsed script, the process identifies (at 220) a story hierarchy and for the media project. In some cases, the story hierarchy identified from a script is flat, in that only one level is identified (e.g., scenes). Many scripts will include only scene information, with no further levels of story hierarchy (e.g., shots or acts). In such cases, the story hierarchy will just be an ordered list of scenes. However, a script for an episode of a television program might include indicators for commercial breaks, which would add a level of hierarchy. Similarly, some scripts might identify acts. The identified story hierarchy may be supplemented by a user after the script is imported in some embodiments.

The process also identifies (at 225) a character list for the media project. As mentioned, scripts will generally format character names in such a way that the parser can clearly identify them. The process will identify each instance of any character name and then eliminate duplicate names in some embodiments. Some embodiments eliminate duplicate names as the names are identified (by checking the newly identified name against a running list of character names). Other embodiments eliminate duplicate names after all character names are identified.

Next, process 200 matches (at 230) characters with sections of the story hierarchy. Some embodiments essentially create a character list for each scene (or other story hierarchy section) based on the appearance of a character in the script for a particular scene. Additionally, for each character, a list of scenes is created. When an instance of a character name is encountered while parsing a script, some embodiments first identify whether the character is already in the list of characters. The character is added to the list if the name is not already there. The scene in which the character instance appears is also noted for the character, and for the scene the presence of the character is noted. However, different embodiments may use different permutations of such a character-scene matching process. For instance, some embodiments may initially generate the list of scenes and characters, then re-read the script for each character to identify all of the character's scenes.

Figure 4:
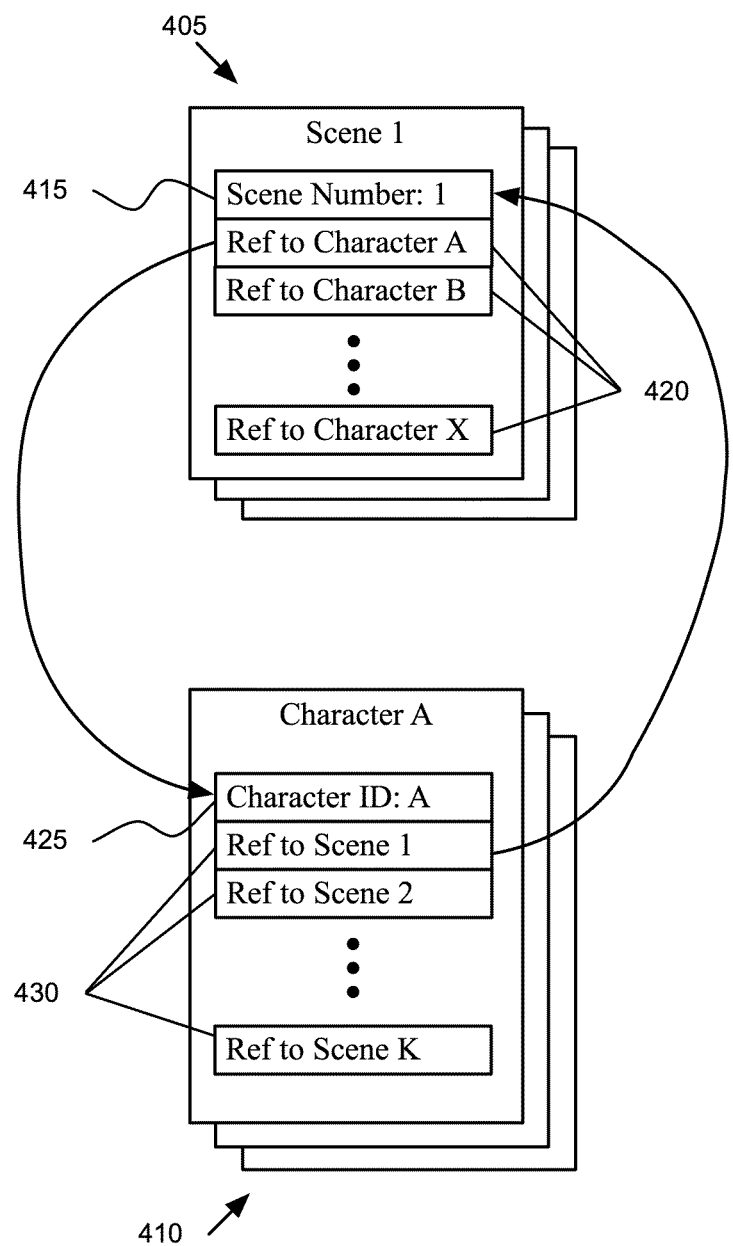
FIG. 4 conceptually illustrates the data structures of some embodiments.

As shown in FIG. 3, the output of process 200 for the script 300 is a list of scenes and characters 330 and associations between the scenes and characters 335. FIG. 4 conceptually illustrates data structures created for scenes and characters by the script import process of some embodiments (e.g., process 200). FIG. 4 illustrates a set of scene data structures 405 and a set of character data structures 410.

The scene data structure 405 is a data structure for "Scene 1". The data structure 405 includes a scene number field 415 and references 420 to several characters. The scene number field 415 identifies the scene represented by the data structure. If the scene has a name (e.g., "Importing the Script"), then this may be included in the Scene number field 415 or in a separate field in different embodiments. The references 420 to characters include a reference to each character involved in the scene, according to the script. These references may be pointers to data structures representing the various characters in some embodiments.

The character data structure 410 is a data structure for "Character A". The data structure 410 includes a character ID field 425 and references 430 to several scenes. The character ID field 420 identifies the character represented by the data structure. The references 430 to scenes include a reference to each scene in which the character plays a role, according to the script. These references may be pointers to data structures representing the various scenes in some embodiments. As shown, the reference 420 to Character A in the data structure 405 for Scene 1 points to the data structure 410, and the reference 430 to Scene 1 in the data structure 410 for Character A points to the data structure 405. Some embodiments do not create both references, but instead only list all of the characters in each scene or all scenes for each character.

B. Portable Application

In some embodiments, the media production application includes two separate applications on at least two devices. The main media production application that stores all of the data and generates production reports operates on a first device (e.g., a personal computer, smart phone, etc.) while a secondary portable application that is used to photograph various potential production locations operates on a second device (e.g., a smart phone with a digital camera). Though the two applications are described as operating on separate devices in this description, one of ordinary skill will recognize that the features could all be combined into a single production application that operates on a single device.

Figure 5:
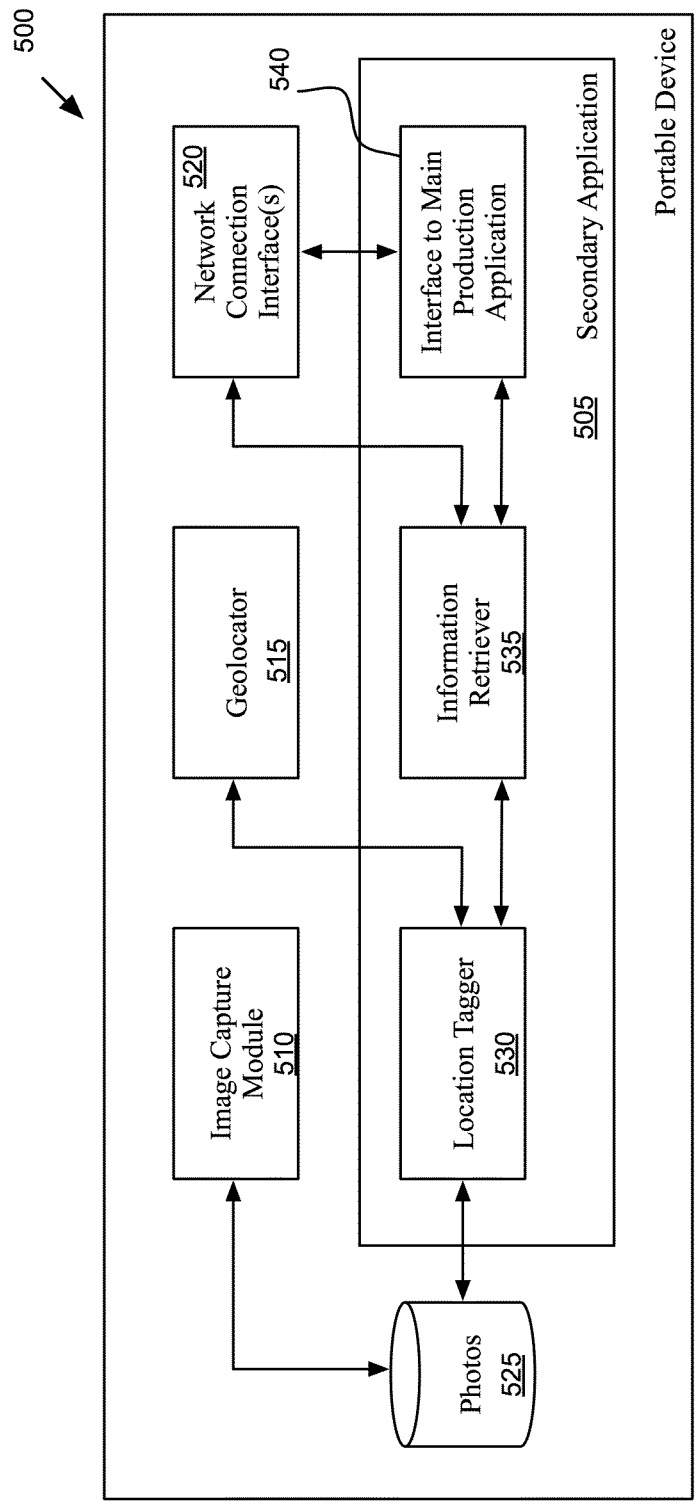
FIG. 5 conceptually illustrates the software architecture of a portable device that includes a secondary portable application.

FIG. 5 conceptually illustrates the software architecture of a portable device 500 that includes such a secondary portable application 505. In addition to the secondary application 505, the portable device 500 includes an image capture module 510, a geolocator 515, and a set of network connection interfaces 520. The portable device also includes a photo storage 525.

The image capture module 510 interfaces with a camera of the portable device to capture images and/or video with the device. In some embodiments, the portable device can capture both images and video, while in other embodiments the portable device can only capture images. In some cases, the portable device will have separate modules for image capture and video capture that interface with the same camera. The image capture module 510 captures images and stores the images in the photo storage 525. The photo storage 525 stores images captured by the camera of the portable device 500. The photo storage may be a removable memory (e.g., an SD card), a non-removable memory such as a hard drive, etc.

The geolocator 515 is a module for identifying the geolocation coordinates (e.g., GPS coordinates) of the device at any given time. In some embodiments, the geolocator 515 interfaces with GPS satellites in order to determine the location. However, some embodiments interface with cell towers through the network connection interfaces 520 to determine the location of the portable device 500. The geolocation information 520 may be appended to a photo to indicate the geolocation of the objects captured in the photo.

The network communication interfaces 520 enable the portable device 500 to communicate with other devices (e.g., a device on which the primary production application is operating) through one or more networks. The networks may include wireless voice and data networks such as GSM and UMTS, 802.11 networks, wired networks such as ethernet connections, etc.

The secondary portable application 505 includes a location tagger 530, an information retriever 535, and an interface to the primary production application 540. The location tagger 530 tags a captured photo with geolocation coordinates identified by the geolocator module 515. While the location tagger 530 is shown as part of the scout application, in some embodiments the portable device 500 automatically tags all captured images with geolocation metadata when the image is captured. In such cases, the secondary application 505 may still include a location tagger 530 that is not needed for performing geolocation data tagging on the particular portable device.

In some embodiments, the location tagger 530 also tags the photo with a location reference to which the photo corresponds. When a photo is captured by the camera of the portable device 500, the secondary application 505 of some embodiments presents the user with the option to enter a location for the photo. When the user enters the location of the photo, this is appended to the photo as metadata. Even with devices that automatically tag photos with geolocation data, tagging with location names may be performed by the application 505. The data structures for photos and locations will be described in further detail below with respect to FIG. 12.

The information retriever 535 connects to third party sources (e.g., databases) on the Internet to determine further information about locations captured in photos by the user. When a photo has been tagged with a location name and geolocation coordinates, the location name is thereby associated with the geolocation coordinates. The information retriever uses the geolocation coordinates to search for information about the location that is available on the Internet. This information may include fire and rescue services information (e.g., addresses, phone numbers), hotels and food information (e.g., addresses, phone numbers, menus, prices, etc.), the production house closest to the location (i.e., from a list of production houses for the media production), maps (e.g., from a production house or hotel to the geolocation coordinates), etc. The information retriever 535 connects to the Internet through the network connection interfaces 520 of the portable device 500. The information retriever of some embodiments is configured to search specific websites (e.g., Yahoo®, Bing®, Google®, etc.) for this information.

The interface to the primary production application 540 enables the secondary application 505 to communicate with the primary production application. The interface 540 is used to transmit data (e.g., photos tagged with location name and geolocation metadata, information retrieved from the Internet, etc.) to the primary production application. The interface connects with the primary application through one or more of the network connection interfaces 520.

In order for the secondary application 505 to connect to the primary application and transmit data, some embodiments require the secondary application 505 to be signed into the primary application. In some embodiments, each copy of the secondary application 505 on various portable devices 500 registers with the primary application and when a user wants to connect to the primary application, he is prompted with a sign-in screen.

Figure 6:
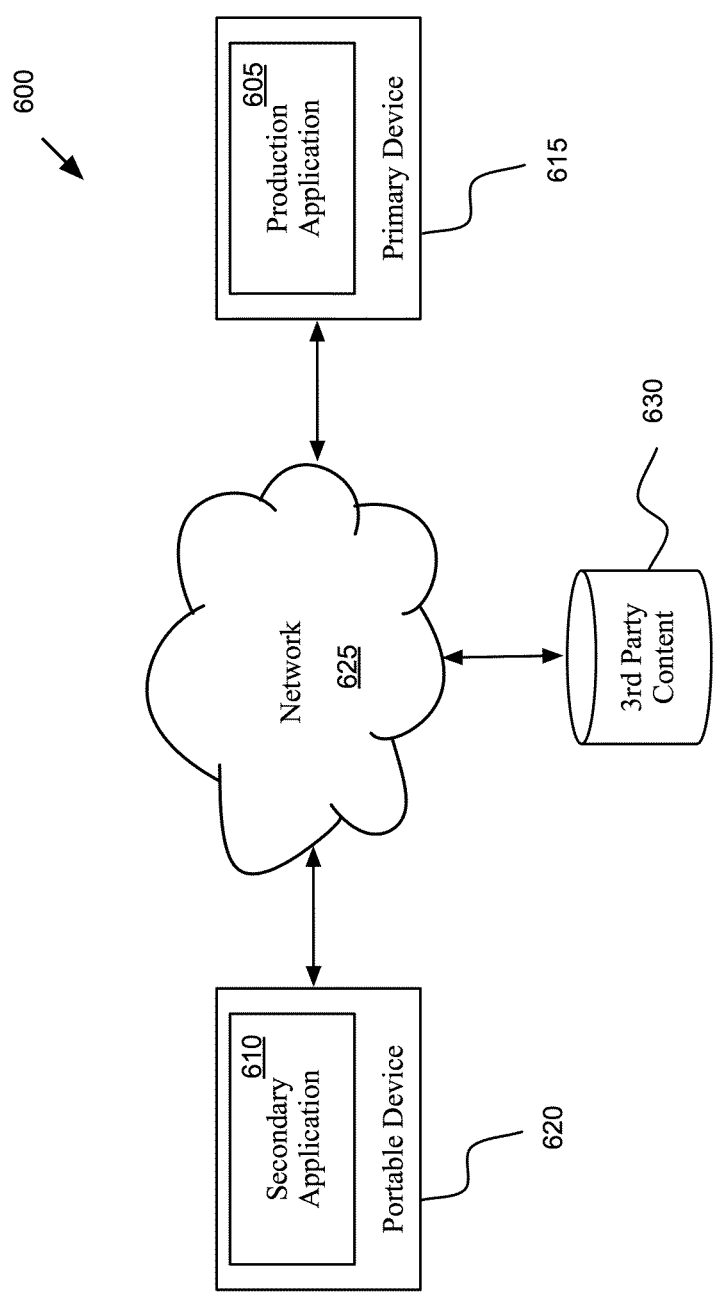
FIG. 6 illustrates a system that includes both the primary production application and the portable secondary application.

FIG. 6 illustrates a system 600 that includes both the primary production application 605 and the portable secondary application 610. The primary production application 605 operates on a first device 615, while the secondary application operates on a portable device 620. Both devices are connected to a network 625 through which they are able to communicate with each other. The network 625 may be a wireless network, a wired network, or a network of networks (e.g., the Internet). In addition to communicating with each other through the network 625, the applications 605 and 610 (through devices 615 and 620, respectively) can communicate with various third party content 630. This content 630 may include information about various production locations, such as the aforementioned fire and rescue services, hotel and food information, etc.

Figure 7:
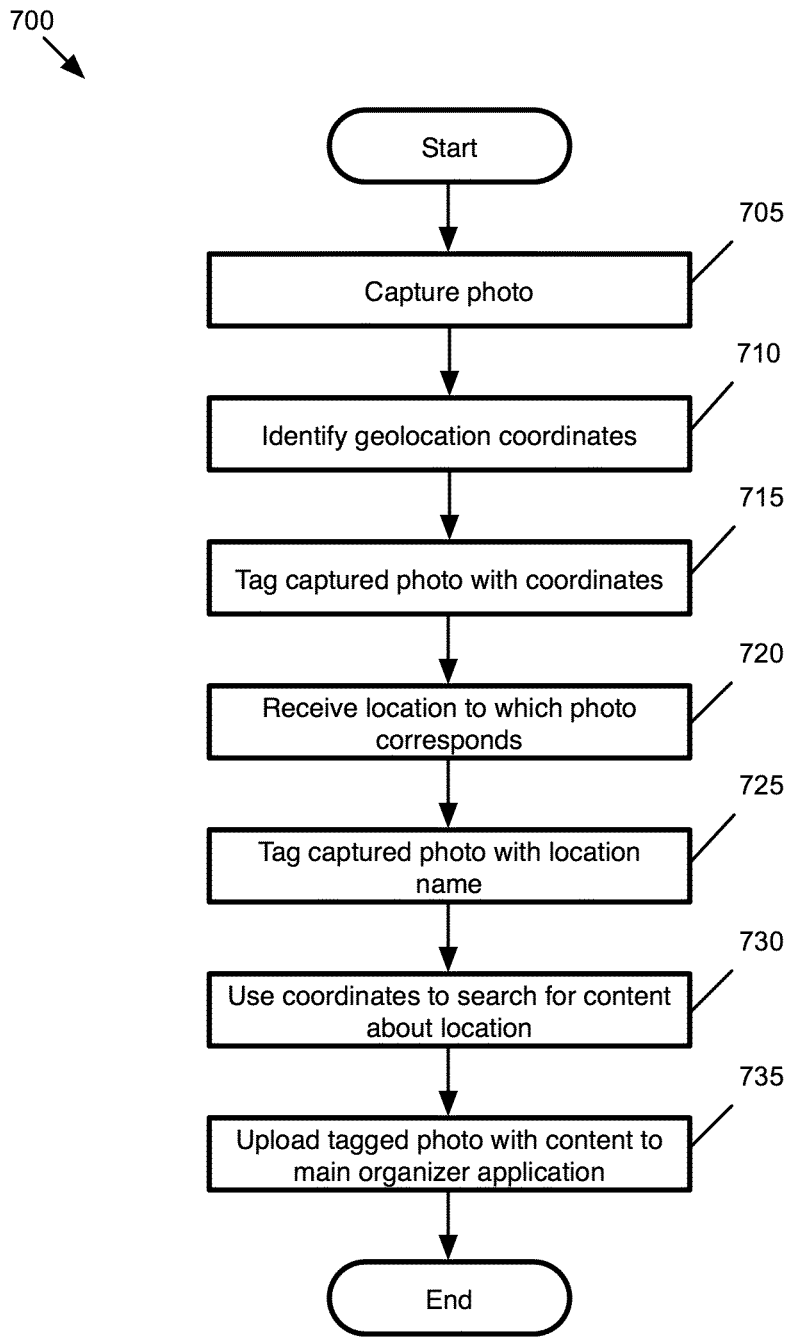
FIG. 7 conceptually illustrates a process performed by a portable device on which the secondary application operates to capture photos and information and upload the data to a primary production application.

FIG. 7 conceptually illustrates a process 700 performed by a portable device on which the secondary application operates to capture photos and information and upload the data to a primary production application. As mentioned, the process 700 may be performed at least partially by a device such as portable device 500.

As shown, the process 700 begins by capturing (at 705) a photo. The photo may be captured in response to user pointing a camera of the device at a particular object or scene and providing input to capture the object or scene as a photo. In some embodiments, the user presses a button on the device or a particular location on the touchscreen in order to activate the photo capture.

The process then identifies (at 710) geolocation coordinates (e.g., GPS coordinates) for the device's current location. The process tags (at 715) the captured photo with these geolocation coordinates. In some embodiments, these operations are performed automatically whenever a photo is captured. The geolocator module 515 of some embodiments regularly tracks the geolocation coordinates (e.g., using communications with cell towers or GPS satellites) and automatically tags photos with the current coordinates when the photos are captured.

Next, process 700 receives (at 720) a location to which the photo corresponds. The process tags (at 725) the captured photo with the location name. The location name may be a town or neighborhood (e.g., Brentwood), a geographic identifier (e.g., Santa Monica Bay), an identifier to signify a particular structure (e.g., Big Bear Cabin), or any other sort of location identifier. In some embodiments, the location tagger 530 receives the location name and tags the photo by appending metadata to the photo.

The location name may be received from a user through a user interface of the device in some embodiments. For instance, a list of potential media production locations may be stored by the secondary application. These are presented to the user when a photo is captured and the user may select one of the potential locations. In other embodiments, the user initiates the location tagging by selecting a photo and inputting (e.g., typing) a location name for the photo.

The process then uses (at 730) the geolocation coordinates identified for the photo at 710 to search for content about the location received at 720. As a single photo is tagged with both the geolocation coordinates and the location name, the geolocation coordinates can thus be associated with the location name. Many Internet search tools (e.g., Bing®, Yahoo®, etc.) can use GPS coordinates to search for information. The information retriever 535 or a similar module of the secondary application 505 is configured to access such search tools and use the geolocation coordinates to search for information. The retrieved information is then associated with the identified location that is already associated with the geolocation coordinates.

Next, the process uploads (at 735) the tagged photo with the retrieved content to the main organizer application. This operation is performed by the interface 540 in some embodiments. The main organizer application of some embodiments creates a data structure for each location and associates the photo with the location. Some embodiments also store the retrieved information in the data structure for the location as well. The data structures for locations, photos, and other aspects of media production are described in further detail below.

C. Manual Data Entry

In addition to creating data structures for a media project through script import and location tagging, some embodiments rely on manual data entry for much of the production data. This data may include the cast and crew, props, information about scenes and characters that goes beyond that found in the script, etc. As data is entered, more interrelated data structures are created for the project that can be used to generate reports and facilitate production, as describe in later sections below.

Figure 8:
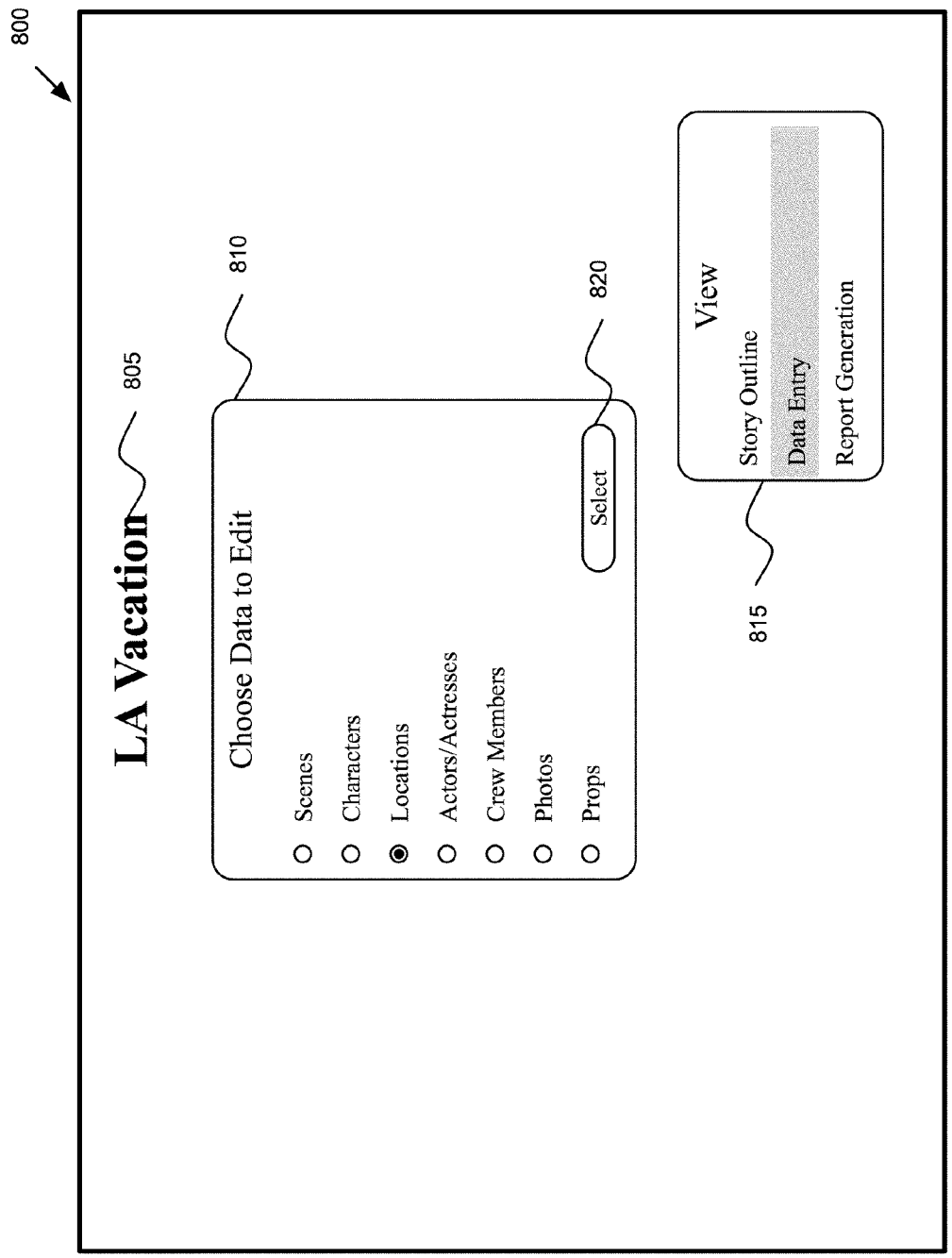
FIGS. 8-10 illustrate examples of a user interface for entering media production data.
Figure 9:
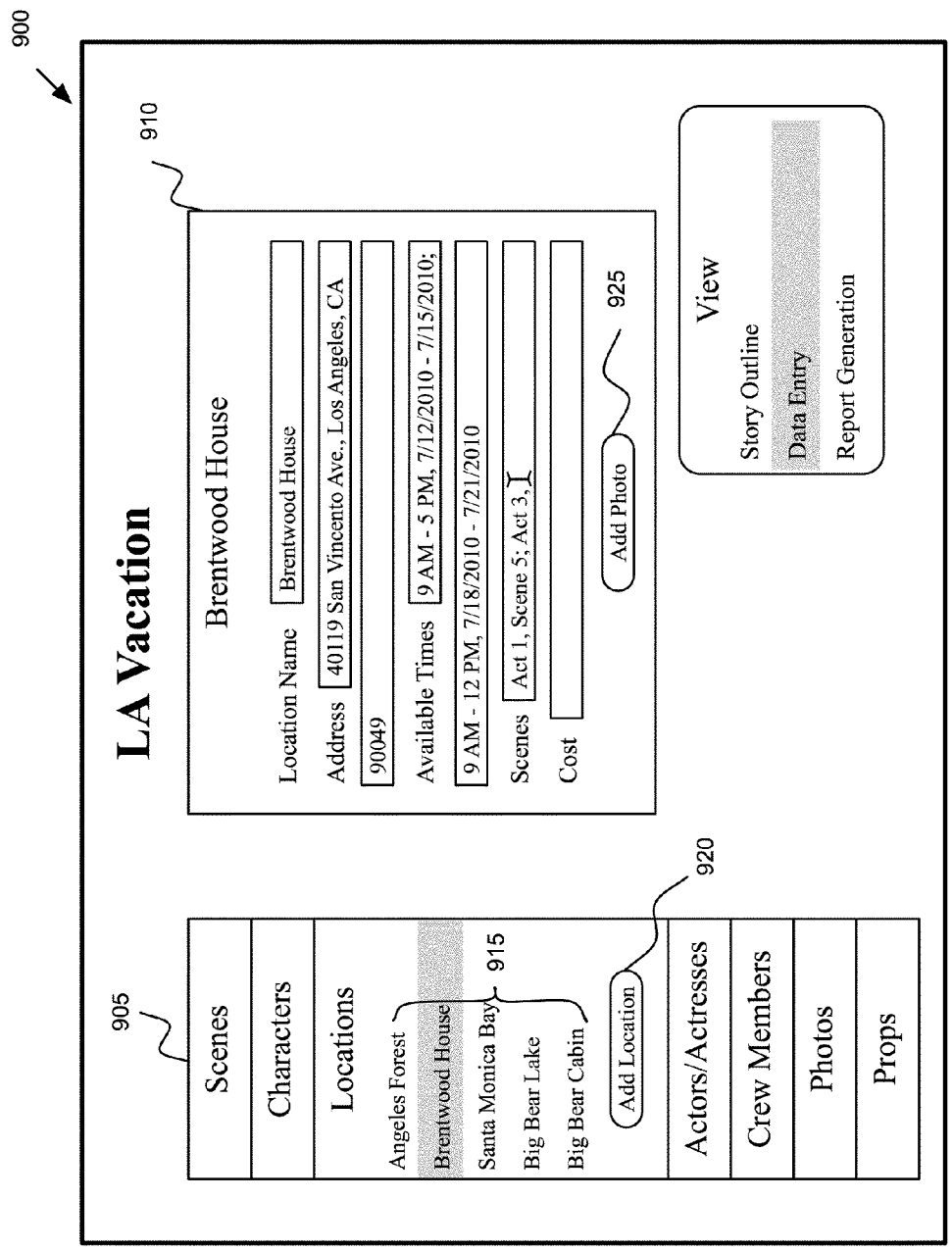
Figure 10:
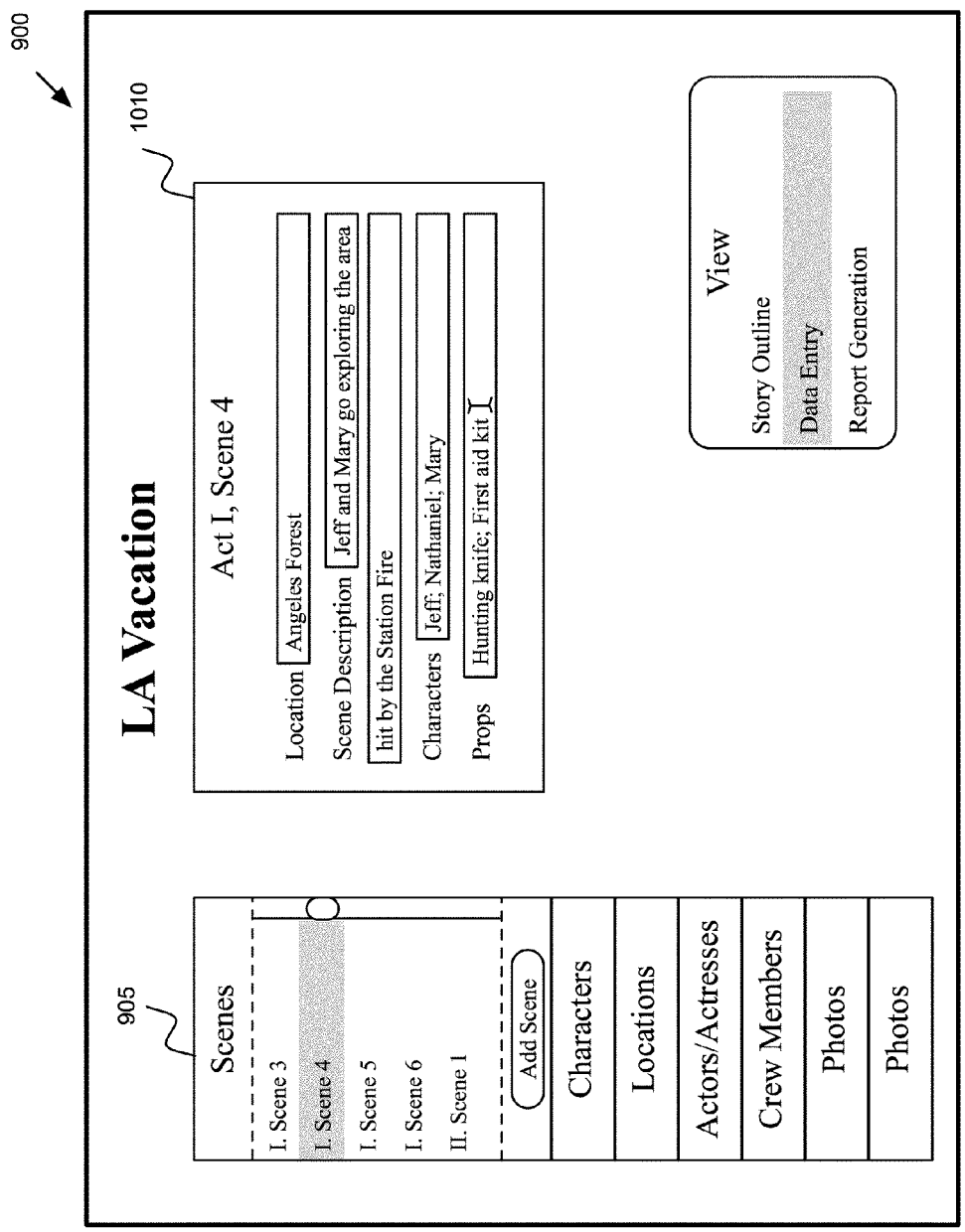

Some embodiments enter data through a user interface of the media production application. FIGS. 8-10 illustrate examples of such user interfaces for entering media production data. As shown in FIG. 8, an introductory user interface 800 includes a project title 805, a data entry introduction dialog box 810, and a view selector 815.

The project title 805 indicates the title of a project that is currently being edited or viewed. In this and following examples, the project title is "LA Vacation". The data entry dialog box 810 enables a user to select a type of data to enter. The illustrated choices in dialog box 810 are scenes, characters, locations, actors and actresses, crew members, photos, and props. The user can select the "Select" button 820 in order to choose a selected data type. In some embodiments, the user selects one of the data types with a cursor controller and then selects (e.g., clicks) the select button. In some embodiments, the user interface is presented through a touchscreen and the user touches the data type and then the button 820. In some embodiments with a user interface, no button is present and the user simply touches the data type he wants to select.

One of ordinary skill will recognize that various other options for types of data may be presented in different embodiments. Furthermore, the options may not be presented via a dialog box—instead, the user interface shown in the following FIGS. 9 and 10 may be automatically displayed and the user may select data to enter via that user interface.

The view selector 815 presents three selectable items that enable a user to choose between three different views for the media production application. The story outline and report generation views will be described in further detail in the sections below. As shown, the data entry view is currently selected. In some embodiments, selection of the data entry selectable item causes the display of the dialog box 810. In some embodiments, the dialog box 810 is presented automatically when a project (e.g., "LA Vacation") is opened.

FIG. 9 illustrates the user interface 900 that is presented when the location data type is selected and a location data form is presented. As shown, the user interface 900 includes a data display area 905 and a data entry form 910, in addition to the title and view selector. The data display area 905 displays various selectable items representing various pieces of data that are part of the currently displayed project. In the example shown, selectable items are presented for scenes, characters, locations, actors and actresses, crew members, photos, and props. As mentioned above, various other types of data may be presented as well. The locations section of the display area is currently open, and the five production locations are presented as selectable items 915. In some embodiments, selecting one of these selectable items will cause the display of a data entry form for the selected location. The display area 905 also includes an "Add Location" selectable item 920 that enables the user to add a new data structure for a new location.

As shown, the "Brentwood House" location is currently selected, and thus the data entry form 910 for the Brentwood House location is displayed. The data entry form 910 allows a user to enter information about the location that is relevant to the production of the media project. The illustrated fields include the name of the location, the address (in some cases, information beyond a zip code may not be possible), the times that the location is available for production activities, scenes that will be filmed at the location, and the cost of using the location. In addition, an "Add Photo" selectable item 925 enables the user to select a photo and associate the photo with the location.

FIG. 10 illustrates the user interface 900 with the scenes header selected in the data display area 905. Scene 4 of Act 1 is currently selected, and therefore a data entry form 1010 is currently displayed that allows a user to enter and edit scene information. The scene information includes a location and a list of characters. This data may be automatically populated based on the import of a script, but may also be edited in after the fact. Additional information, such as the scene description and the props needed for the scene may also be entered into data entry form 1010.

One of ordinary skill will recognize that similar data entry forms may be available for the various other types of data that is part of a media project. For instance, character data entry forms may include fields for an actor's name that is playing the character, the scenes in which the character appears, and how much the actor is being paid.

The user interface displayed in the above figures illustrates only one of many different possible user interfaces for entering data into the media production application. For example, the various elements of the UI may be moved around to different locations. The data display area 905 may have a different configuration—for instance, the different types of data may be selected as tabs. Furthermore, the appearance of the data entry forms may be different.

D. Location Information Retrieval

As described in subsection B, above, the secondary application of some embodiments uses geolocation coordinates associated with a location (through mutual association with a photo) to retrieve information about the location. A similar function may be performed by the primary production application in some embodiments. The production application may, either automatically or in response to a user request, search for information for the various media production locations for a particular project.

Figure 11:
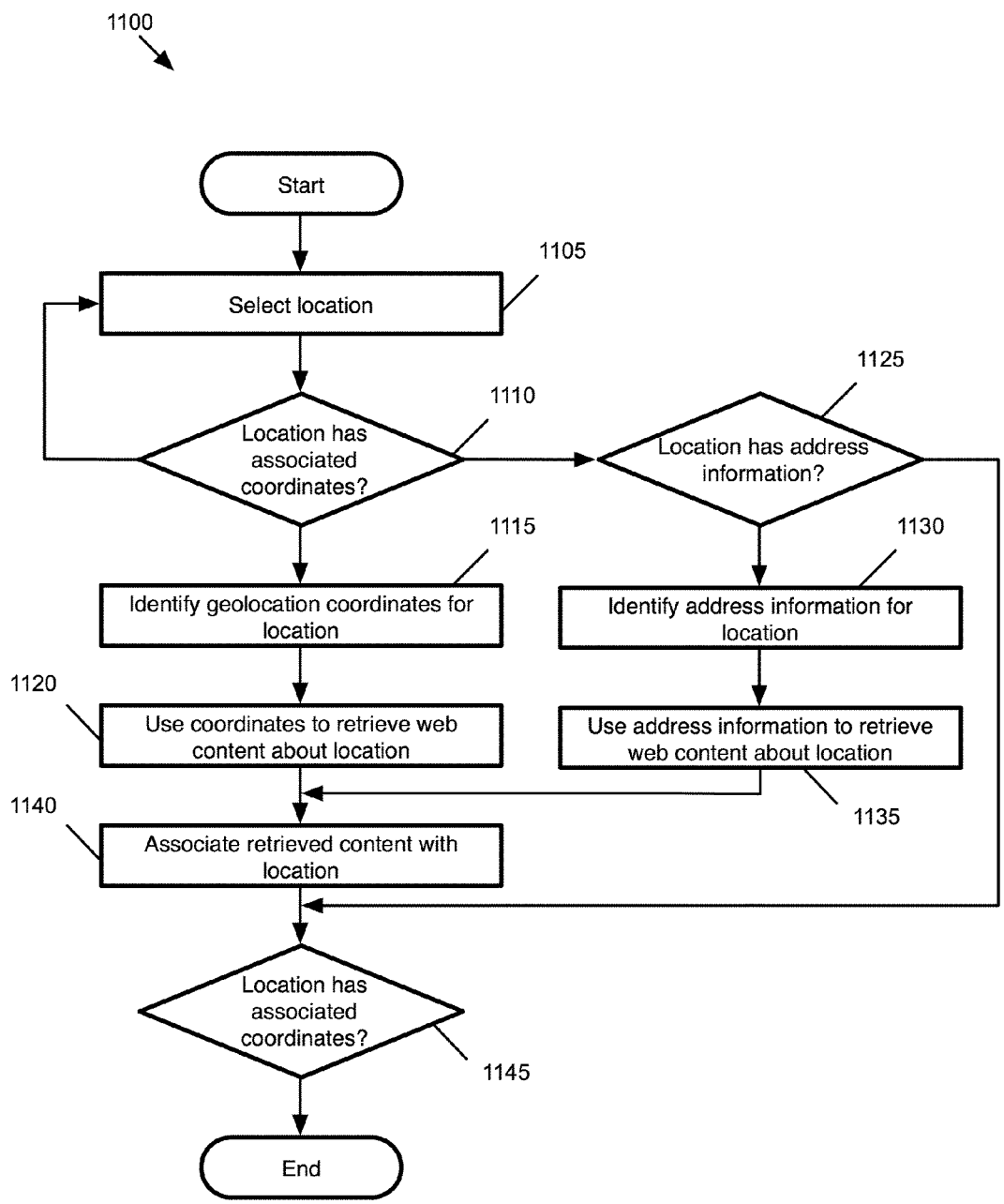
FIG. 11 conceptually illustrates a process of some embodiments for retrieving information about one or more locations.

FIG. 11 conceptually illustrates such a process 1100 of some embodiments for retrieving information about one or more locations. As noted above, in some embodiments the process 1100 may be initiated by user input requesting information about the production locations of a media project, or automatically (e.g., when the project is opened by the media production application). As shown, the process 1100 begins by selecting (at 1105) a location. The process may select the locations randomly, or in a particular order (e.g., alphabetical order, order in which the data structures for the locations were created, etc.).

The process then determines (at 1110) whether the location has associated geolocation coordinates. In some embodiments, a location will have geolocation coordinates when a photo tagged with such coordinates has been associated with the location. Some embodiments also enable a user to enter geolocation coordinates directly for a location or, if a detailed address is provided, will identify geolocation coordinates for the address based on a third party database.

When the location has associated coordinates, the process identifies (at 1115) those geolocation coordinates. The process then uses (at 1120) the coordinates to retrieve web content about the location. This content may include fire and rescue services information (e.g., addresses, phone numbers), hotels and food information (e.g., addresses, phone numbers, menus, prices, etc.), the production house closest to the location (i.e., from a list of production houses for the media production), maps (e.g., from a production house or hotel to the geolocation coordinates), etc. The media production application of some embodiments is configured to search specific websites (e.g., Yahoo®, Bing®, Google®, etc.) for this information.

When the location does not have associated coordinates, the process determines (at 1125) whether the location has associated address information. In some embodiments, address information is manually input by a user (e.g., as shown in FIG. 9). In order to search for web content, some embodiments require that a specific address (e.g., more than just a zip code) be available, though other embodiments will search based only on a city name and/or zip code.

When the location does not have associated address information, the process proceeds to 1145, described below. When address information is available for the location, the process identifies (at 1130) this address information. The process then uses (at 1135) the address information to retrieve web content about the location. This content may include fire and rescue services information (e.g., addresses, phone numbers), hotels and food information (e.g., addresses, phone numbers, menus, prices, etc.), the production house closest to the location (i.e., from a list of production houses for the media production), maps (e.g., from a production house or hotel to the geolocation coordinates), etc. The media production application of some embodiments is configured to search specific websites (e.g., Yahoo®, Bing®, Google®, etc.) for this information.

The process 1100 then associates (at 1140) this retrieved content with the location. In some embodiments, this entails storing the retrieved content in a data storage structure for the location, as described in further detail below. The process then determines (at 1145) whether content should be retrieved for any more locations. When more locations remain, the process returns to 1105. Otherwise, the process ends.

E. Data Structures

As described above, much of the data for a media project is stored in various interrelated data structures by the media production application of some embodiments. A data structure for a particular entity stores all of the information about that entity, including associations with other entities. The scene and character data structures of FIG. 4 are examples of such data structures that include only data determined from importing and parsing a script. The following FIGS. 12 and 13 conceptually illustrate additional data that may be stored in such data structures by the media production application.

Figure 12:
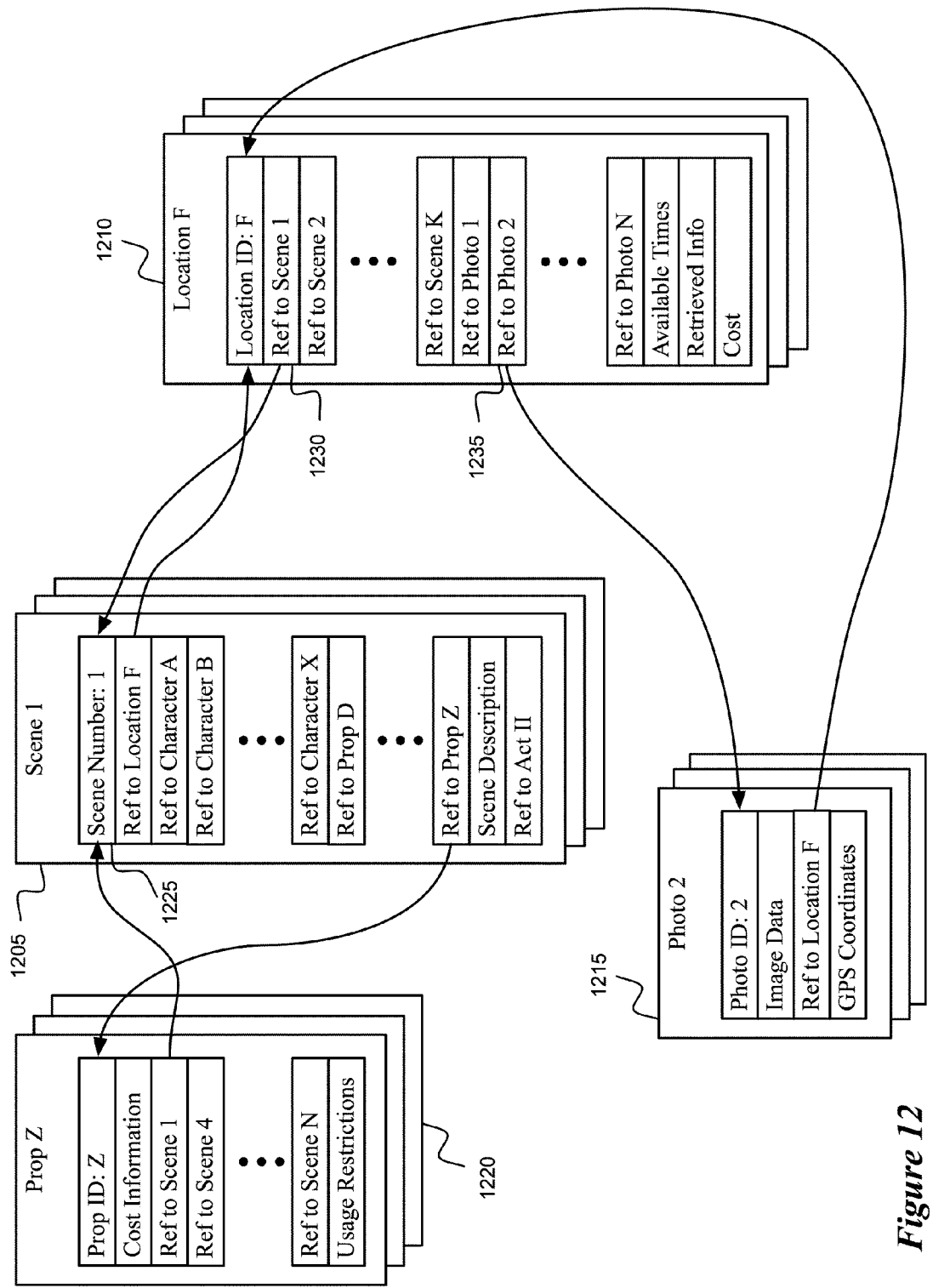
FIGS. 12 and 13 conceptually illustrate the data structures of some embodiments.

FIG. 12 conceptually illustrates a more complete data structure for a scene 1205 and data structures 1210-1220 for various entities associated with the scene. As illustrated, for each type of entity (scenes, locations, photos, props) multiple data structures are stored. For simplicity, only one data structure for each entity type is illustrated in the figure.

As shown, the data structure 1205 for Scene 1 includes a scene number field, a reference to a location, references to a number of characters, references to a number of props, a scene description field, and a reference to an Act. The scene number may be a number (running from 1 to N, where N is the number of scenes in the media production) or may also include an Act number (e.g., I.1) or similar indicator of a different level in the story hierarchy in various embodiments.

The references to the characters, as shown in FIG. 4, may be generated from parsing a script or may be input from a user. The references to props and a location will generally be input by the user, though in some embodiments this information can be identified in a script as well.

The scene description, similarly, may be included in a script but will generally be input by a user. The scene description may include a short description of what takes place in the scene, as well as information such as whether the scene is and interior or exterior scene and a day or night scene. This latter information may be determined from a script in some embodiments.

The reference to Act II enables the hierarchy of story sections to be stored for a media project. In some embodiments, each scene stores a reference to one act, and each act stores references to all of the scenes that are part of the act. Similarly, if there is a level of story hierarchy below the scenes, each scene stores a reference to each section at this lower level (e.g., each shot). Through these references, associations are created to develop a hierarchy of story sections.

As illustrated via the arrows in FIG. 12, the reference 1225 to Location F points to a data structure 1210 for that location and the reference 1230 to Prop Z points to a data structure 1220. In some embodiments, these references (and the other references) are implemented as pointers to the respective data structures, though other data references may be used as well.

As mentioned, the reference 1225 in data structure 1205 points to the data structure 1210 for Location F. The location data structure 1210 stores information about Location F, including a location ID field, references to scenes that will be filmed at the location, references to photos of the location, times that the location is available, any information retrieved about the location (e.g., fire and rescue, hotel, and food information, maps, etc.), and a cost of using the location. As illustrated via the arrows, a reference 1230 to Scene 1 points to the data structure 1205 (such that these two data structures point to each other), and a reference 1235 to Photo 2 points to the data structure 1215 for the photo. Some embodiments will only use one photo per location, while other embodiments (as shown) will allow multiple photos. The retrieved information may be stored as local data, or may be stored as links to data on the world wide web.

The data structure 1215 for Photo 2 includes a photo ID field, image data, a reference to a location with which the photo is associated, and geolocation coordinates indicating where the image was captured. The image data field stores the actual image data that defines the image in some embodiments. However, other embodiments create a data structure for a photo that stores a reference to a location in memory of the actual image (e.g., a separate .jpg, .png, etc. file). The geolocation coordinates are often appended to the photo at the time of capture, as described above in subsection B.

In addition, as illustrated by data structure 1220, some embodiments create data structures for each prop that will be used in the media production. The data structure 1220 includes a prop ID field, cost information, references to each scene in which the prop is needed, and any usage restrictions for the prop (e.g., times when the prop will not be available for use).

Figure 13:
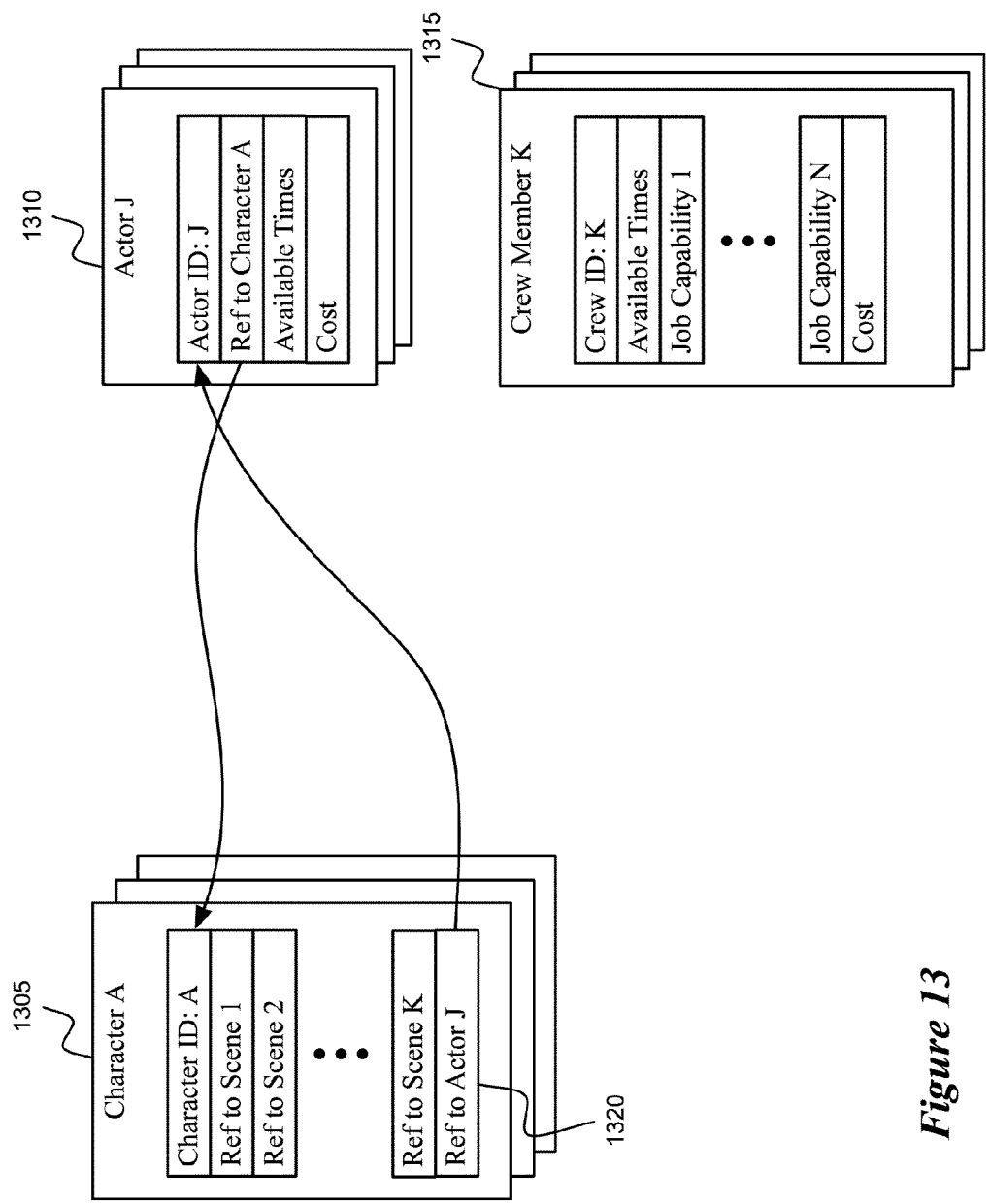

FIG. 13 conceptually illustrates a more complete data structure for a character 1305, as well as a data structure 1310 for an actor associated with the character and a data structure 1315 for a crew member. As with the data structures illustrated in FIG. 12, for each type of entity multiple data structures may be stored.

As shown, the data structure 1305 for Character A includes a character ID field, references to a number of scenes in which the character appears, and a reference to an actor that is playing the character in the media production. In some embodiments, as described above, the character data structure is created with the scene references from an imported script. Once an actor is casted for the character, that data can be manually added to the data structure for the character.

As shown, a data structure 1310 is also created for the actor and a reference 1320 is created within data structure 1305 that points to data structure 1310. The data structure 1310 for Actor J includes an Actor ID field, a reference to the character that the actor is playing in the media production, the times that the actor is available, and the cost of the actor. When multiple actors will be playing a character (e.g., if the character will be shown in both youth and old age), then some embodiments create multiple actor data structures that both refer to a single character. However, some embodiments will create multiple characters (e.g., "Child Jim" and "Adult Jim") that each match with one actor.

As illustrated in FIG. 13, data structures are also created for crew members in some embodiments. The data structure 1315 for Crew Member K includes a Crew ID field, times that the crew member is available, and the cost (e.g., cost per day, cost per hour, or salary) of the crew member. Some embodiments, as shown, also list various job capabilities that the crew member is capable of performing, in case certain crew members are not able to perform all possible jobs. The crew member data structure 1315 stands alone in that it does not include any references to other data structures. Different embodiments, however, may include references in the data structures for crew members (e.g., if the crew members have been assigned to particular scenes).

In the above data structures, all of the references are shown as pointing in both directions. For example, the data structure 1205 includes a reference 1225 to data structure 1210, while the data structure 1210 includes a reference 1235 to data structure 1205. Some embodiments only store one reference—e.g., the data structure for a scene includes a reference to each character in the scene, but the data structure for a character does not include references to the scenes featuring that character, or vice versa.

Figure 14:
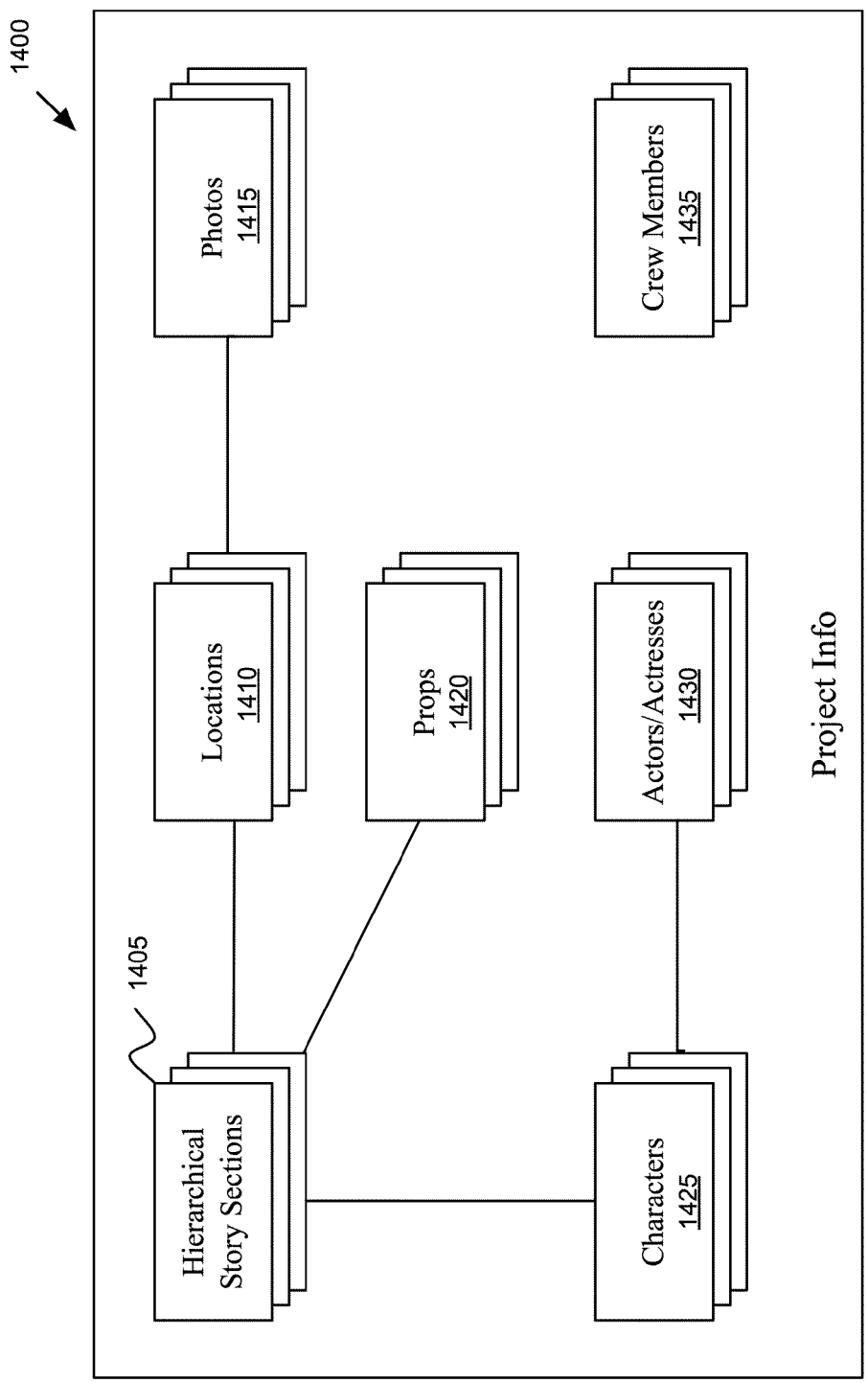
FIG. 14 illustrates project data for a media production project.

FIG. 14 illustrates project data for a media production project 1400. As shown, the project includes data for hierarchical story section (e.g., scenes, acts, etc.) 1405, locations 1410, photos 1415, props 1420, characters 1425, actors and actresses 1430, and crew members 1435. The references between the data follow those illustrated in FIGS. 4, 12, and 13—the story sections refer to locations, props, and characters, the locations refer to photos and story sections, the props refer to story sections, the characters refer to story sections and actors, and the actors refer to characters. One of ordinary skill will recognize that some embodiments will include more or different types of data structures than the seven shown in these figures.

II. Project Outline

The above section described various ways in which the media production application of some embodiments receives data—script import, photo capture and tagging, manual entry, and automatic information retrieval—as well as how the data is stored. The following sections describe ways in which the media production application of some embodiments uses this data for the production process.

Figure 15:
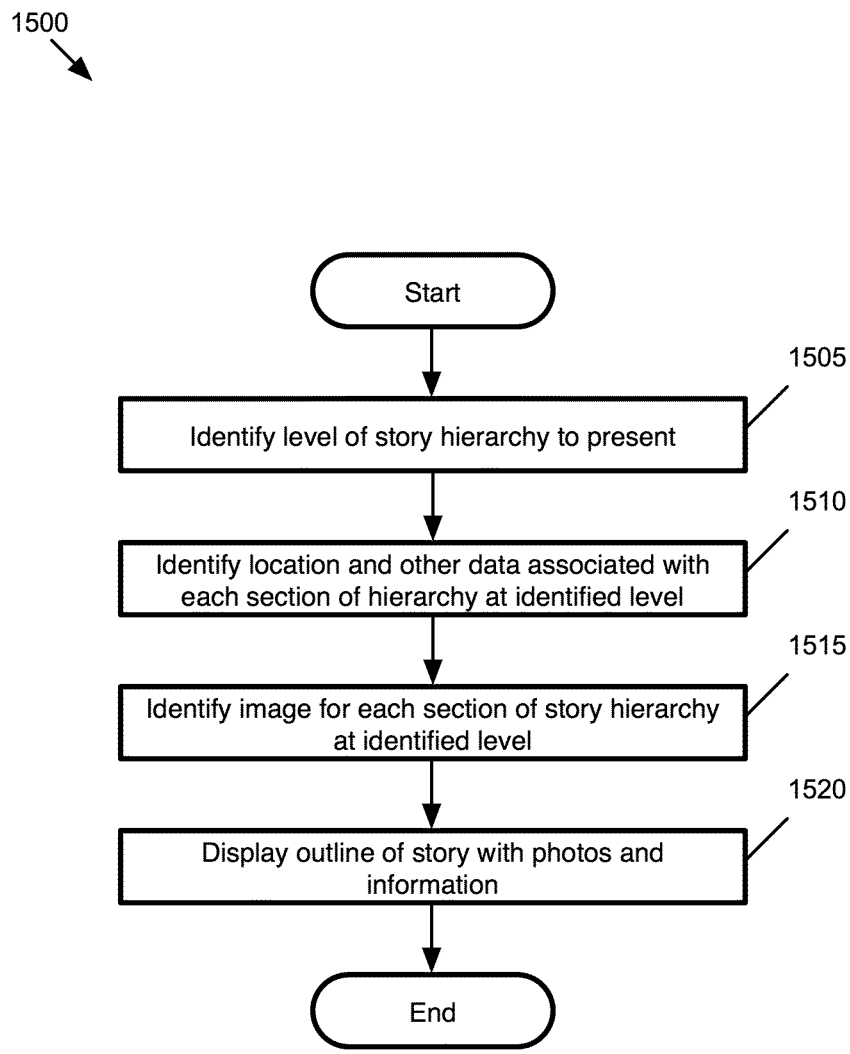
FIG. 15 conceptually illustrates a process of some embodiments for generating a project outline.

One use of the production data is to generate a project outline of the media presentation being produced. The project outline of some embodiments allows a user to visualize the story of the media presentation while also providing relevant production information to the user. FIG. 15 conceptually illustrates a process 1500 of some embodiments for generating such a project outline.

As shown, the process 1500 begins by identifying (at 1505) a level of the story hierarchy to present. Based on either a default or user instructions, different embodiments will present the story hierarchy at different levels. For instance, some embodiments may present the story at the scene level by default, but enable a user to select the acts level, shot level, or some other level of the story hierarchy for presentation.

Once the level of the hierarchy is identified, the process identifies (at 1510) the location and other data associated with each section of the hierarchy at the identified level. For example, each scene is associated with a location where the scene will be filmed once the user has input this information. When no location has been input for a particular scene, this information cannot be identified. The other data associated with the section may include the characters that are present in the scene, the actors playing those characters, crew that have been assigned to the scene, etc.

The process also identifies (at 1515) an image for each section of the story hierarchy at the identified level. In some embodiments, a location photo is used for each section. For instance, as illustrated by the data structures described above, each scene is associated with a location at which the scene will be filmed, and each such location is associated with one or more photos. For each scene shown in the project outline, one of the photos associated with the scene's location is displayed. When a location is used for multiple scenes, some embodiments use the same photo for each scene in the project outline, while other embodiments rotate through the various photos associated with the location. Some embodiments use a blank image or a default image when either no location has been input for a scene or there are no photos associated with a scene's location.

Figure 16:
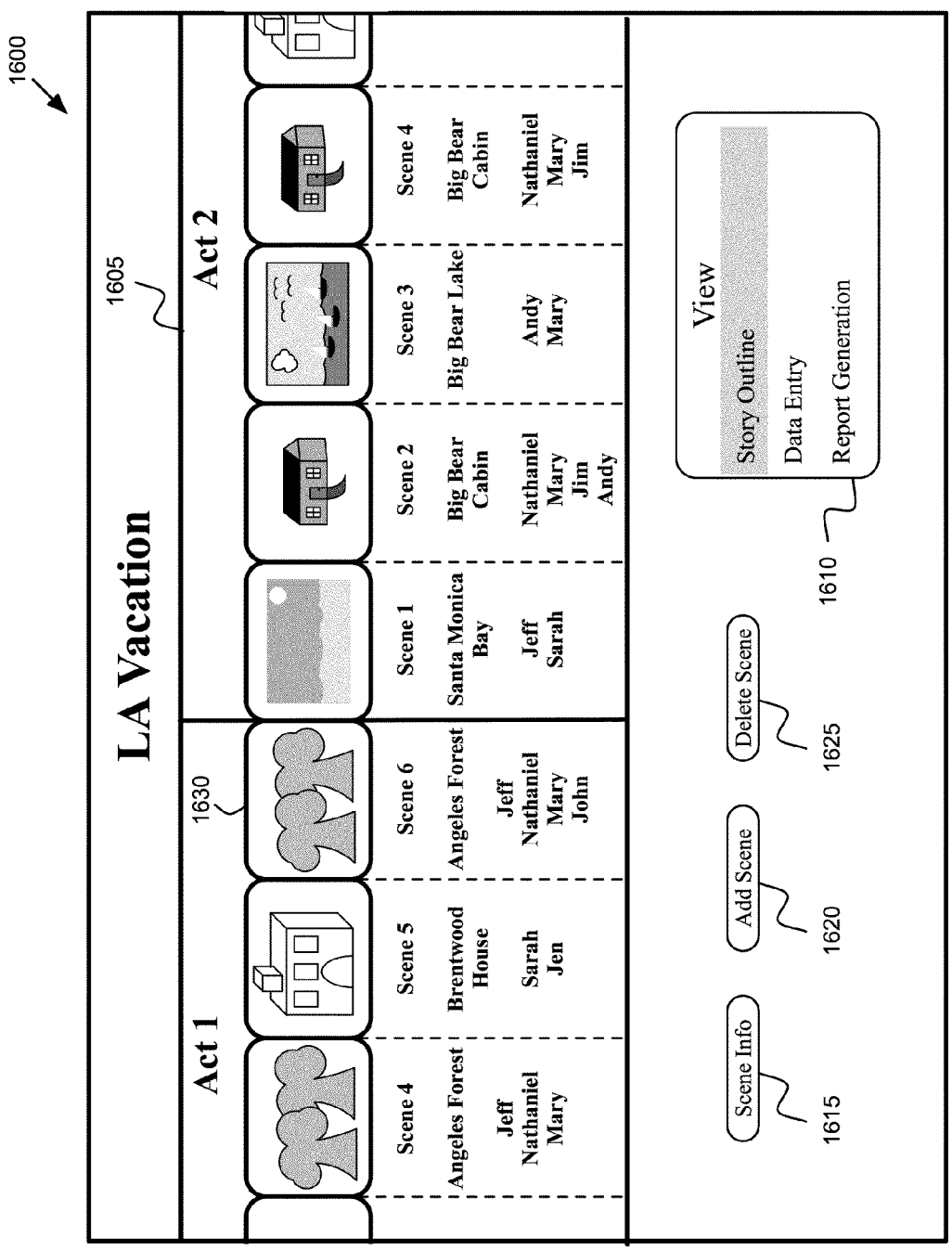
FIG. 16 illustrates a presentation of the project outline of some embodiments.

The process then displays (at 1520) an outline of the story with the identified photos and information. Various ways of presenting the information are possible. FIG. 16 illustrates one such presentation of the project outline. FIG. 16 illustrates a graphical user interface (GUI) 1600 that includes a project outline 1605, a view selector 1610, and three selectable user interface items 1615-1625. The view selector, as described above by reference to FIG. 8, 0815 presents three selectable items that enable a user to choose between three different views for the media production application. As shown, the story outline view is presently selected.

The project outline 1605 illustrates the scenes of a media presentation ("LA Vacation") in chronological order (within the presentation). For each scene, a photo associated with the location at which the scene will be filmed is displayed. In some embodiments, these images are selectable items that can be used to modify the scene order, as will be described in further detail below. The outline 1605 also displays a scene name (e.g., "Scene 6" for item 1630) along with the name of the location at which the scene will be filmed (e.g., "Angeles Forest") and the characters in the scene (e.g., "Jeff, Nathaniel, Mary, John"). As mentioned, other information could be displayed for each scene in the outline, such as the crew members that are working the scene and the day the scene is scheduled to be filmed, if that information is available. The scenes are also divided into Acts in the outline 1605—portions of Acts 1 and 2 are currently displayed.

The first item 1615 of the selectable items causes the display of detailed scene information about a selected scene. A user (e.g., using a cursor controller, touchscreen, etc.) can select a scene in the project outline 1605 and then select item 1615 in order to cause this display. As shown below with respect to FIG. 22, some embodiments display the type of scene (e.g., day vs. night, interior vs. exterior), the location and characters, a short description of the scene, and the script of the scene. Various manners of displaying this or other information are possible in various different embodiments.

The add scene item 1620 and delete scene button 1625 enable users to either add a scene (e.g., after a selected scene, at the end of the project, etc.) or delete a selected scene. When a user selects the add scene item 1620, some embodiments bring up a data entry form such as that shown in FIG. 10 that enables the user to enter information about the new scene.

Figure 17:
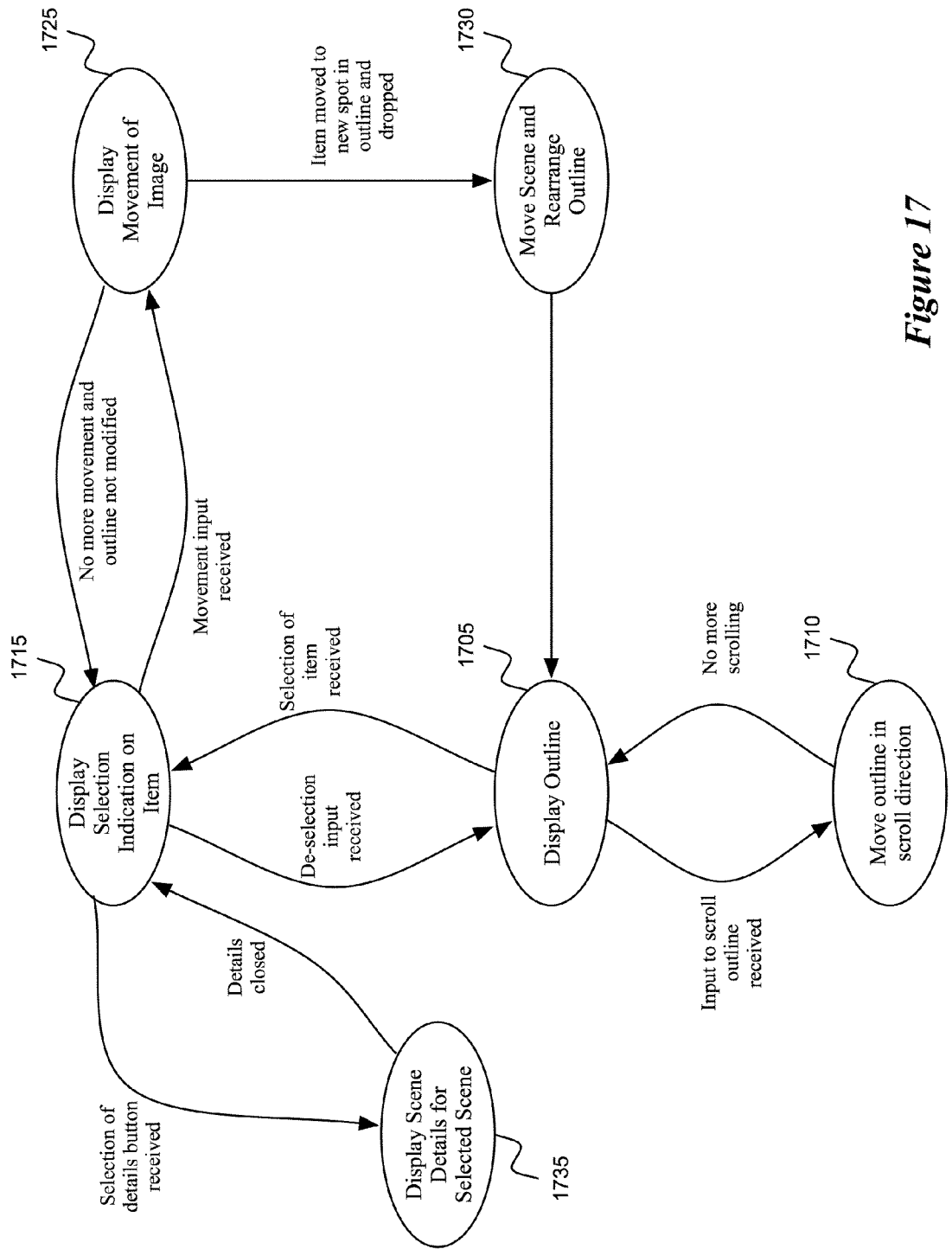
FIG. 17 illustrates a state diagram that reflects the various states and transitions between those states for a project outline GUI of some embodiments.

Once the project outline is displayed, various user interactions are possible. FIG. 17 illustrates a state diagram that reflects the various states and transitions between those states for a project outline GUI of some embodiments. The state diagram will be described by reference to FIG. 16 and FIGS. 18-22. One of ordinary skill will recognize that the various actions represented by the states and transitions of FIG. 17 are only a subset of the possible actions that can be performed in the project outline GUI of some embodiments.

As shown, the project outline is initially displayed (at 1705). FIG. 16, described above, illustrates an example of the display of such a project outline of some embodiments. Some embodiments use process 1500 in order to display the project outline.

As shown in FIG. 16, the entire project outline is not displayed on a screen at once in some embodiments. Users can scroll through the project outline to view other portions of the outline. When a user provides scroll input (e.g., using a cursor controller, touchpad, touchscreen, etc.), the GUI transitions to state 1710 to move the outline in the direction of scrolling. When the user has stopped entering the scroll input, the GUI transitions back to state 1705 to continue displaying the static outline.

Figure 18:
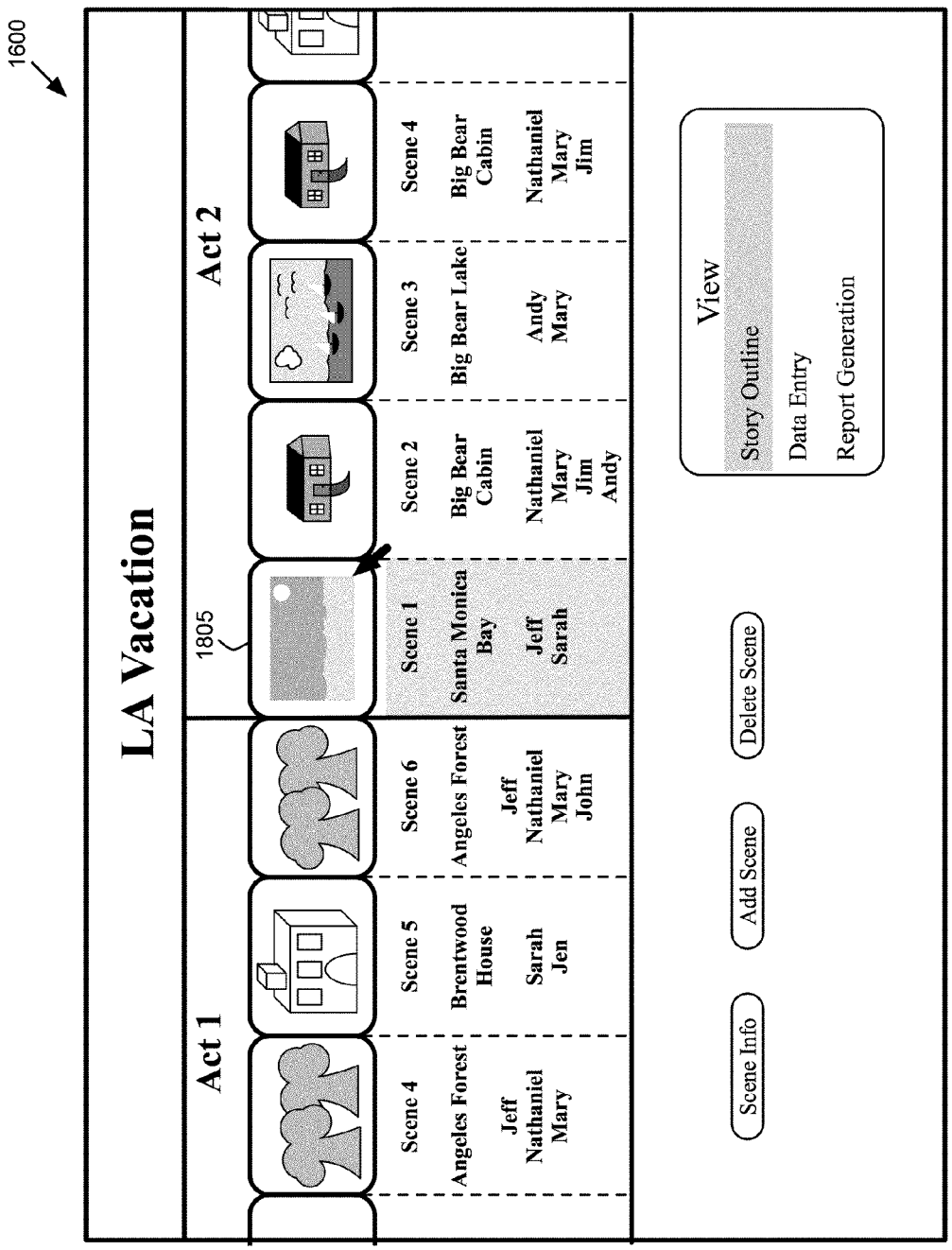
FIG. 18 illustrates the GUI of FIG. 16 after a selectable item representing one of the scenes has been selected.

Users can also select an item in order to perform various actions on the item. As shown, when input selecting an item is received, the GUI transitions to state 1715 to display a selection indication on the selected item. The selection input may be a click of a mouse, a tap of a touchpad, a tap of a touchscreen, etc. FIG. 18 illustrates the GUI 1600 after a selectable item 1805 representing Act 2, Scene 1 has been selected. As shown, the box in which information about the selected scene is displayed has been highlighted to indicate the selection. Various different embodiments use different selection indicators, such as highlighting the edges of the box, highlighting the image representing the scene, etc. When de-selection input is received with respect to a selected item, the GUI transitions back to state 1705 from state 1715. The de-selection input may be a second click or tap on the selected item, a click or tap outside of the project outline, etc.

With the item selected, a user may elect to rearrange the outline of the media project by moving the selected scene item. The user can move and then drop the item into a new portion of the outline in order to modify the order of the scenes (or other story hierarchy sections) in the media project. This feature enables the user to use the project outline as a sort of storyboard for the media project.

Figure 19:
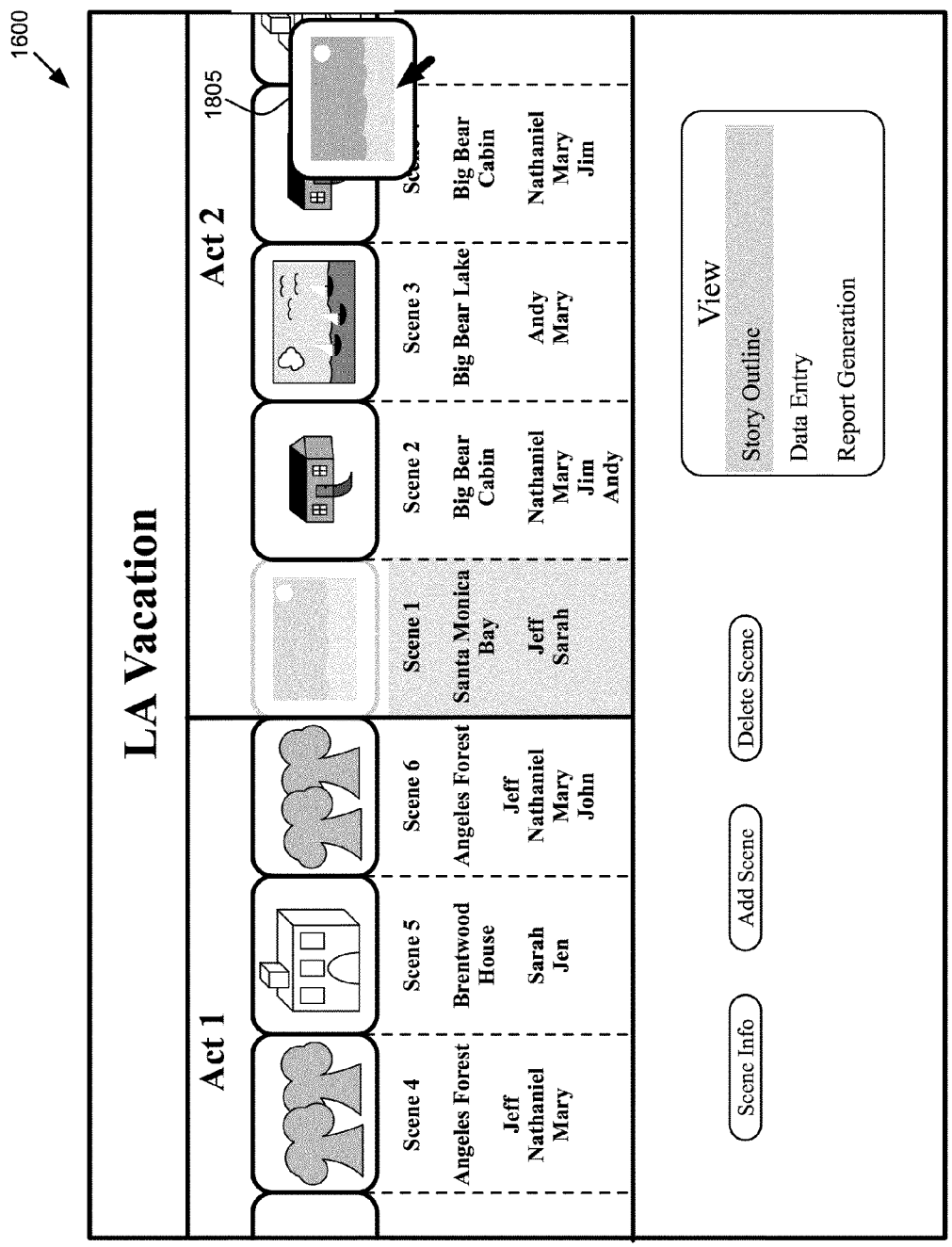
FIG. 19 illustrates the GUI of FIG. 16 as the user moves the scene item to the right.

As shown, when movement input is received to move a selectable scene item, the GUI transitions to 1720 and displays the movement of the image representing the selected scene. The user input to move a selectable item may be a click and drag operation with a cursor controller, a sliding movement with a finger on a touchscreen, or similar user interface interaction. FIG. 19 illustrates the GUI 1600 as a user is moving the scene item 1805 to the right. As shown, the scene item 1805 representing Act 2, Scene 1 has been moved such that it is between the items representing Act 2, Scene 4 and Act 2, Scene 5. The image portion of item 1805 has moved, although the highlighted information section remains in its previous location and a faded version of the image remains unmoved as well. One of ordinary skill will recognize that this example is only one of many possible manners of displaying the movement of a selectable story hierarchy item.

Figure 20:
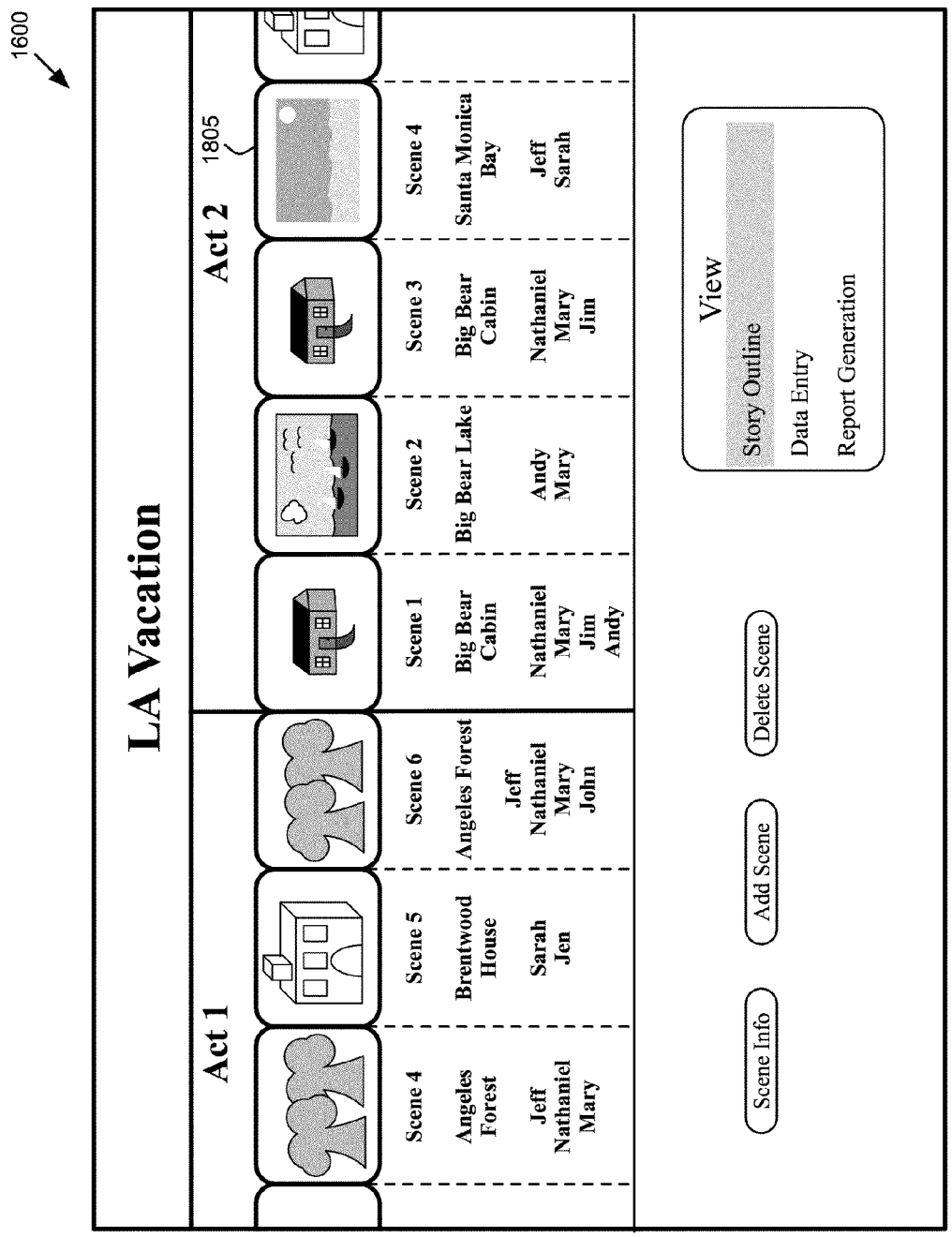
FIG. 20 illustrates the GUI of FIG. 16 after a user has dropped the selectable scene item at the location shown in FIG. 19.

When item is no longer moved (e.g., the user has released a button on a cursor controller, removed a finger from a touchscreen, etc.), the GUI transitions either back to 1715 or to 1730. When the item has been moved to a new location in the outline and dropped, the GUI moves the selectable item and rearranges the outline. The GUI then transitions back to 1705 (in some embodiments, the item remains selected and the GUI transitions to 1715 instead). FIG. 20 illustrates the GUI 1600 after a user has dropped the selectable scene item 1805 at the location shown in FIG. 19. As shown, this has caused the scenes to rearrange in the outline. The scene represented by selectable item 1805 is now represented by Act 2, Scene 4, and what were previously Scenes 2-4 have moved up and are now Scenes 1-3. When the item is not moved far enough from its previous location before being dropped, the outline is not modified and the GUI transitions back to 1715 where the item remains selected.

Figure 21:
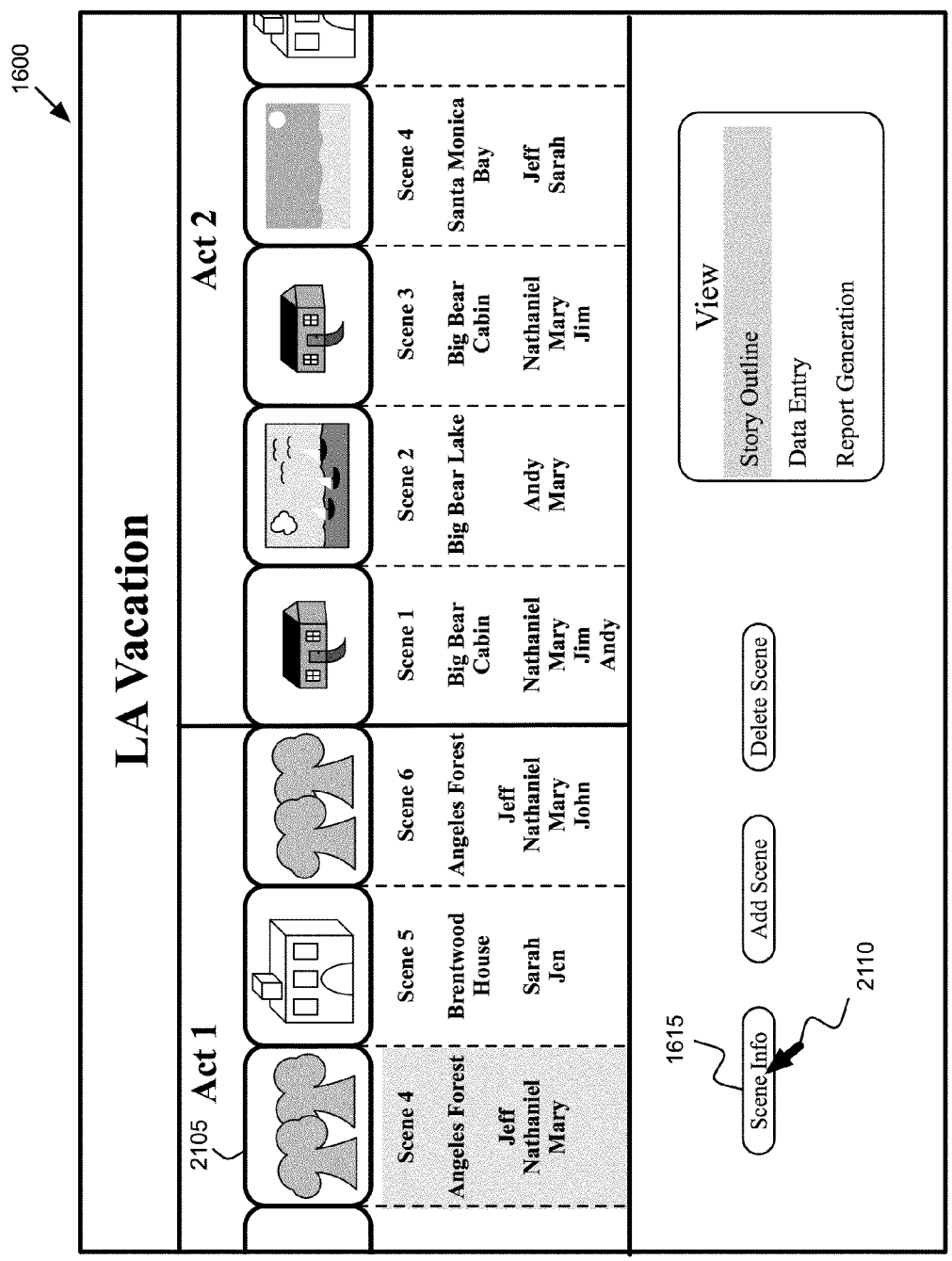
FIG. 21 illustrates the GUI of FIG. 16 with the selectable item representing one of the scenes selected.

Another action that can be performed when an item is selected is to display scene details for a scene represented by a selected item. As mentioned above, the GUI 1600 includes a selectable item 1615 that causes the display of scene info. When selection of this button is received (or any other similar input, e.g., double clicking or double tapping the selectable item), the GUI transitions to 1735 to display scene details for the selected scene. FIG. 21 illustrates the GUI 1600 with the selectable item 2105 representing Act 1, Scene 4 selected. This figure also shows that a cursor 2110 is displayed over the "Scene Info" selectable item 1615.

Figure 22:
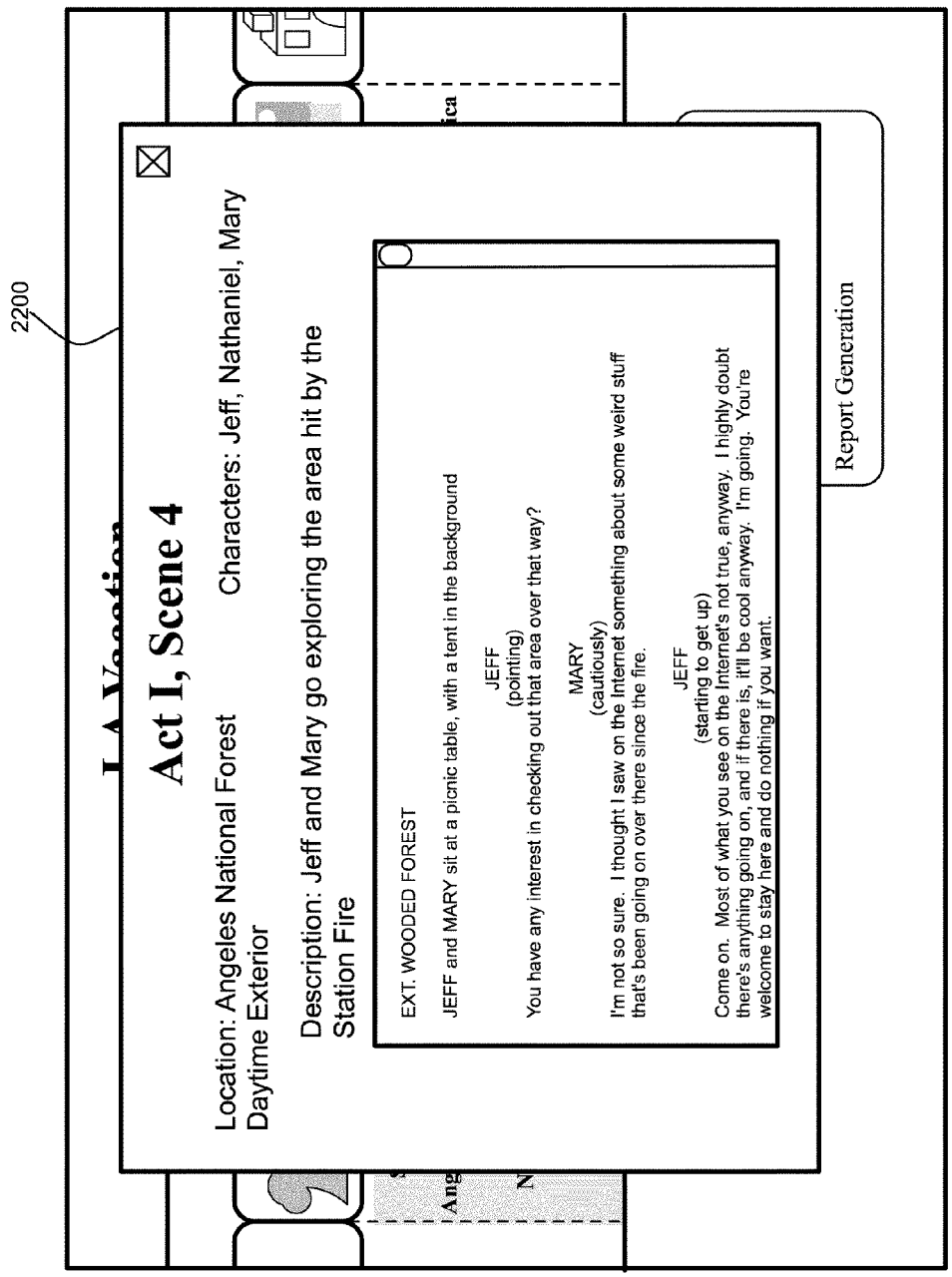
FIG. 22 illustrates the result of a user selecting a "Scene Info" selectable item while the selectable scene item is selected.

FIG. 22 illustrates the result of a user selecting the item 1615 while the selectable scene item 2105 is selected. A display area 2200 that displays scene details for Act 1, Scene 4 is now displayed over the project outline. The scene details include the location and characters that are displayed in the main project outline view, a scene type (daytime exterior), a short description of the scene, and the script for the scene. When the user closes the display area (e.g., by clicking or tapping the "x" in the upper right corner), the GUI transitions back to 1715.

One of ordinary skill will recognize that the examples shown in the preceding section are merely one illustration of how the media production application of some embodiments displays an outline of a media project. For instance, other information could be displayed along with the outline, such as a calendar of upcoming production events, a log of completed production events (e.g., scenes that have already been filmed). Along similar lines, the outline of some embodiments provides indicators for each scene as to whether the scene has been filmed or not.

In addition, the transitions between states of the GUI need not be limited to those shown in FIG. 17. For instance, some embodiments include a transition from state 1725 to state 1705 when a user drops a selectable scene item near to its previous position such that the outline is not modified. In such embodiments, the scene item is deselected when dropped. Adding and deleting scenes will create additional state transitions in some embodiments, as well.

III. Report Generation

In addition to presenting a project outline that enables a user to view an overview of the media project he is producing, the media production application of some embodiments allows a user to generate various reports about the production of a media project using the data stored for the media project. These reports may include filming schedules, cost analysis, schedules for particular actors, statistics from a script, etc.

Figure 23:
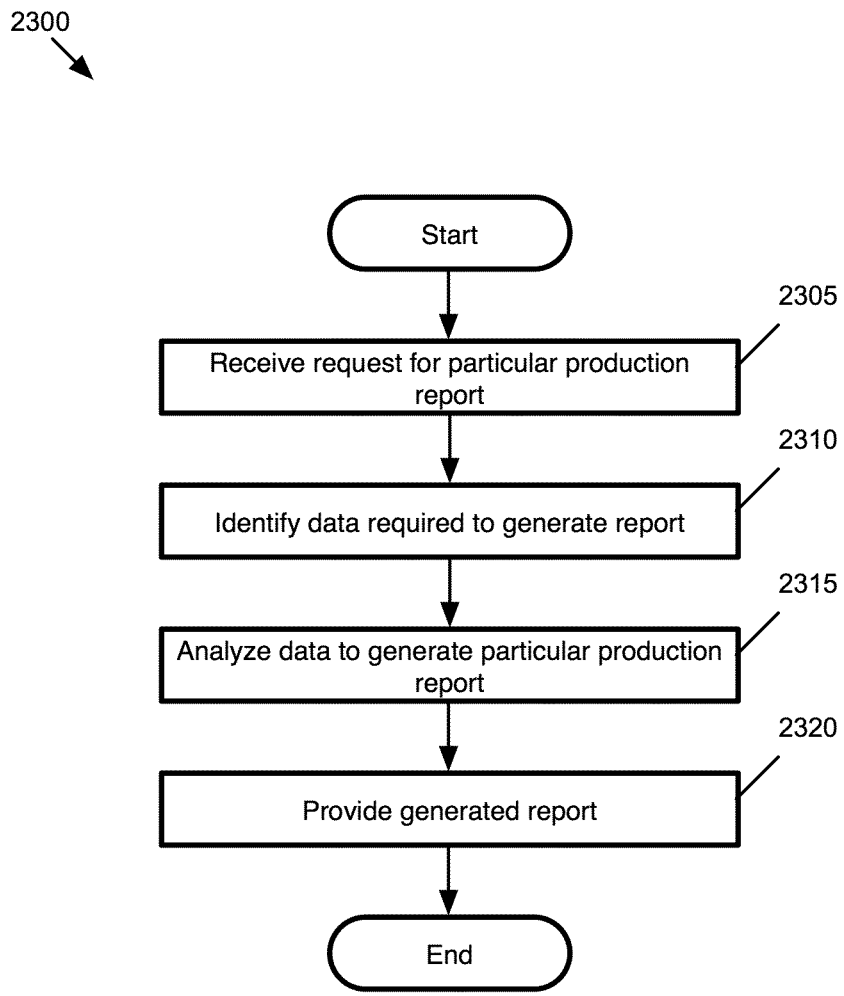
FIG. 23 conceptually illustrates a process of some embodiments for generating reports about the production of a media project.

FIG. 23 conceptually illustrates a process 2300 of some embodiments for generating such reports. As shown, the process 2300 begins by receiving (at 2305) a request for a particular production report. This request may come from a user through an interaction with a user interface. For instance, as described below by reference to FIG. 24, some embodiments provide a list of types of reports that a user can select from: e.g., filming schedules, etc. The user selects a report through a touchscreen, with a cursor controller, etc.

The process 2300 then identifies (at 2310) data required to generate the particular report. Different reports require different data. For instance, when the report asks for particular script statistics such as the number of night scenes versus daytime scenes and/or interior scenes versus exterior scenes, some embodiments need only access the scene data in order to generate the report. However, when a full filming schedule needs to be generated, nearly all of the production data stored for the media project will need to be accessed.

Next, the process analyzes (at 2315) the data in order to generate the particular production report. For a simple report, the analysis may simply include gathering and perhaps counting the data (e.g., for the night vs. day scenes report mentioned above). For schedule generation, analysis of the various days different actors and crew are available, the scenes for which the actors are required, the locations at which the scenes need to be filmed, and the availability of those locations must all be analyzed in order to generate a schedule that allows all scenes to be filmed.

Figure 24:
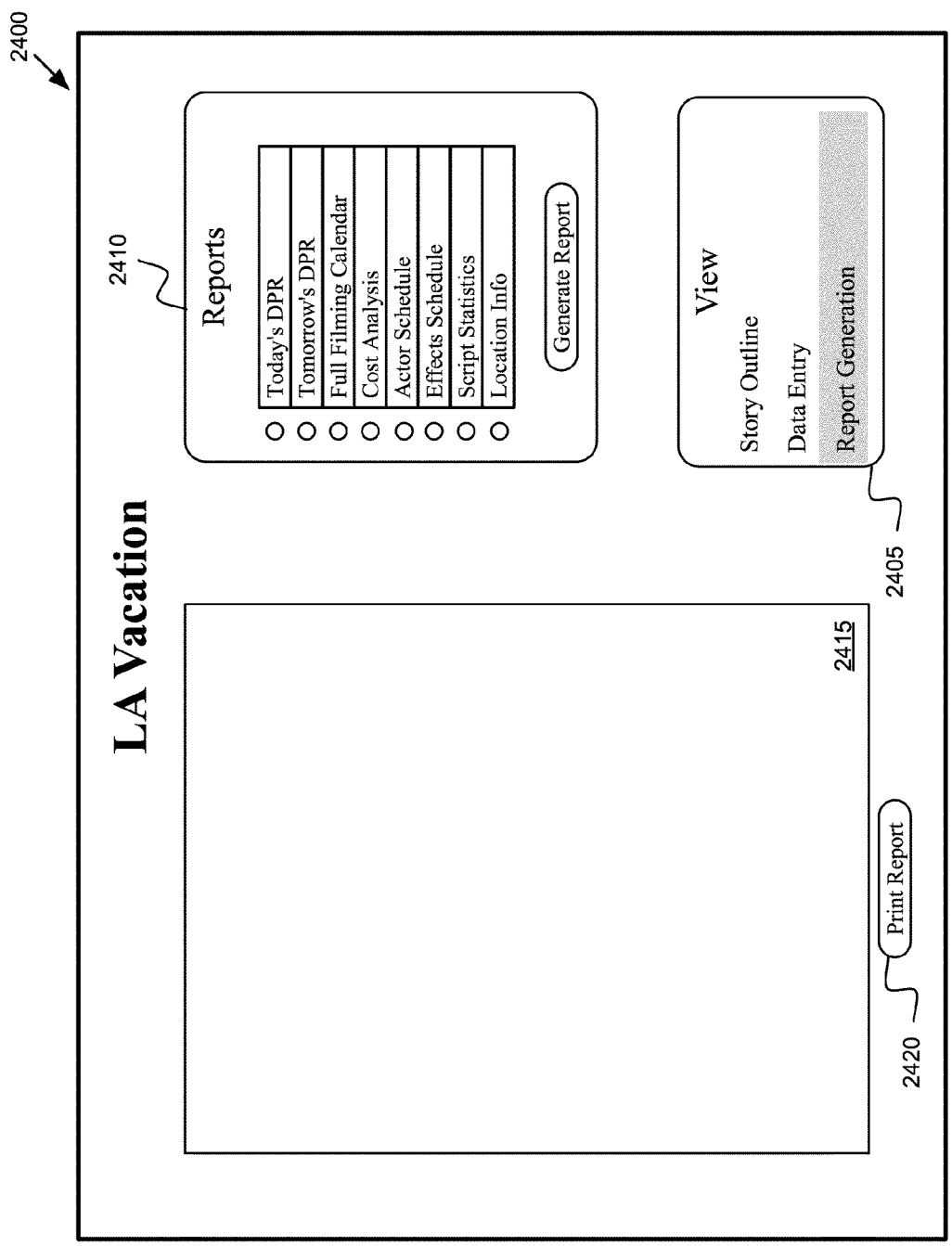
FIG. 24 illustrates a graphical user interface (GUI) that enables a user to select from a list of possible reports and displays a selected report.

When the report is generated, the process 2300 then provides (at 2320) the generated report. This may entail displaying the report in a display area (e.g., as shown in FIG. 24, described below), opening the report in a new window (e.g., as a PDF document or a word processor document), printing the report, e-mailing the report, etc.

As mentioned, many different reports may be generated by the media production application of some embodiments. FIG. 24 illustrates a graphical user interface (GUI) 2400 that enables a user to select from a list of possible reports and displays a selected report. The GUI 2400 includes a view selector 2405, a report selector 2410, and a report display area 2415. The view selector, as described above by reference to FIG. 8, presents three selectable items that enable a user to choose between three different views for the media production application. As shown, the report generation view is currently selected.

The report selector 2410 enables a user to select a report to be generated from several different reports. Report selector 2410 includes eight different reports, but one of ordinary skill will recognize that many other types of reports may be possible as well. For instance, two of the reports shown are daily production reports for the present day and the following day, but daily production reports could be generated for any future day in some embodiments. The other reports that can be generated using the media production application illustrated in FIG. 24 include a full filming calendar that is further described by reference to FIGS. 25 and 26, a cost analysis report, an actor schedule, and effects schedule, script statistics, and location information.

A cost analysis report may be generated by reviewing the cost data from the location, props, cast, and crew data structures in order to determine the total cost of the media production project. Some embodiments also ask a user to input other cost data, such as printing fees, legal fees, and various other production fees (e.g., music, cameras, editing, makeup, etc.). Once all of the data is entered, a table or other report can be generated that breaks down the costs, provides total costs, etc.

An actor schedule identifies, for a particular selected actor or actress, all of the scenes for which the actor is required and when those scenes are being filmed. In order to generate such a schedule for a single actor, the overall production schedule will need to have been generated, either previously or as part of the process of generating the actor schedule. An effects schedule of some embodiments identifies different effects that are required for each scene and lists when the effects are needed based on the production schedule.

The script statistics can include the number of night scenes versus day scenes, interior scenes versus exterior scenes, average length of scenes, etc. When a user selects the script statistics option, some embodiments provide a list of possible statistics that can be computed, and the user is able to select only those that are desired. Other embodiments automatically provide one report with all statistics that the media production application computes.

The location information report of some embodiments includes all information about a particular location. When the user selects the option for the report, the media production application of some embodiments provides a list of locations for the user to select. The report provides information about whichever location is selected. The location information may include photos of the location, automatically retrieved data about the location (e.g., maps, fire and rescue info, hotel and food info, etc.), and a filming schedule for the location, among other information.

Figure 26:
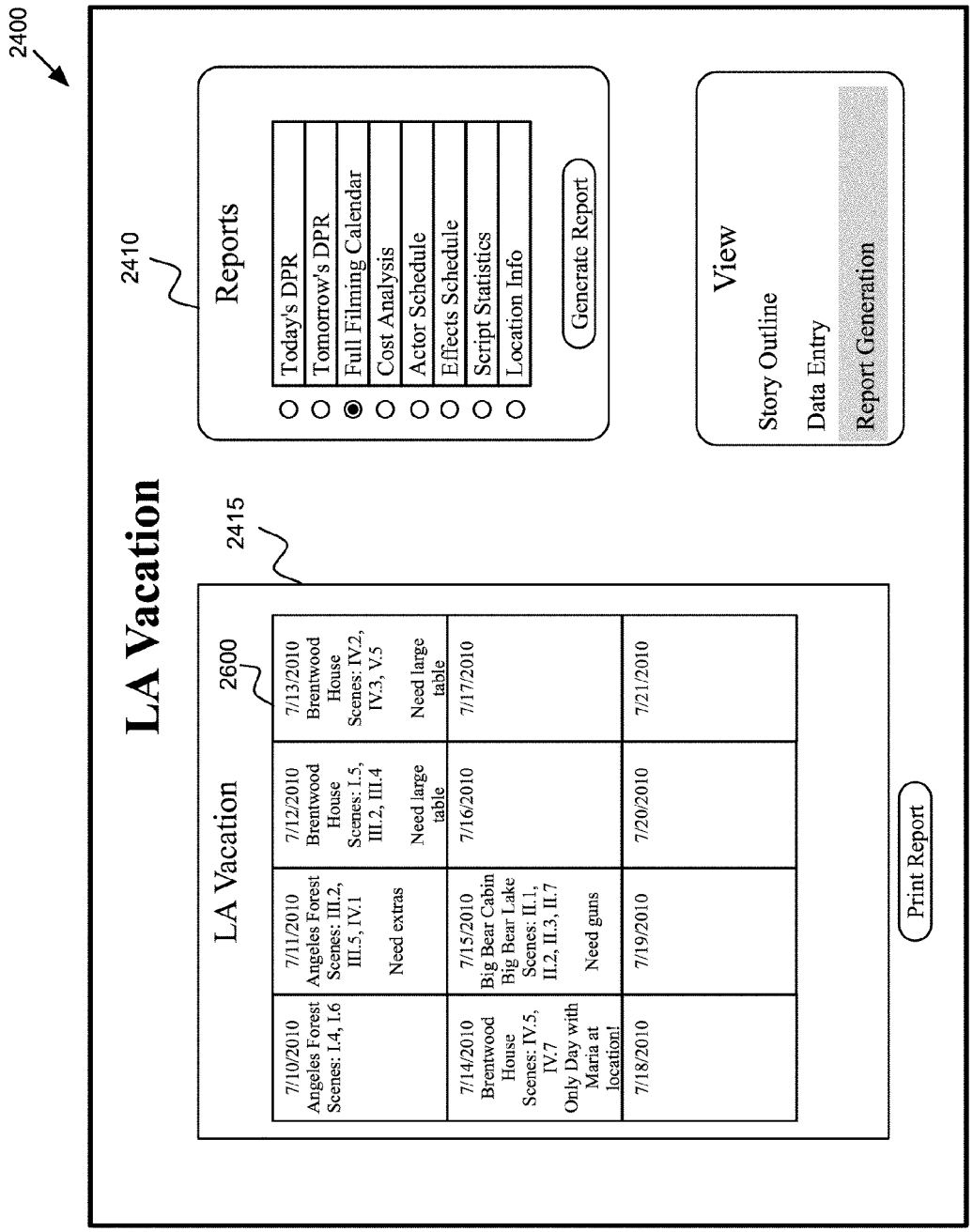
FIG. 26 illustrates an example of a filming schedule displayed in the reports display area of the GUI of FIG. 24.
Figure 28:
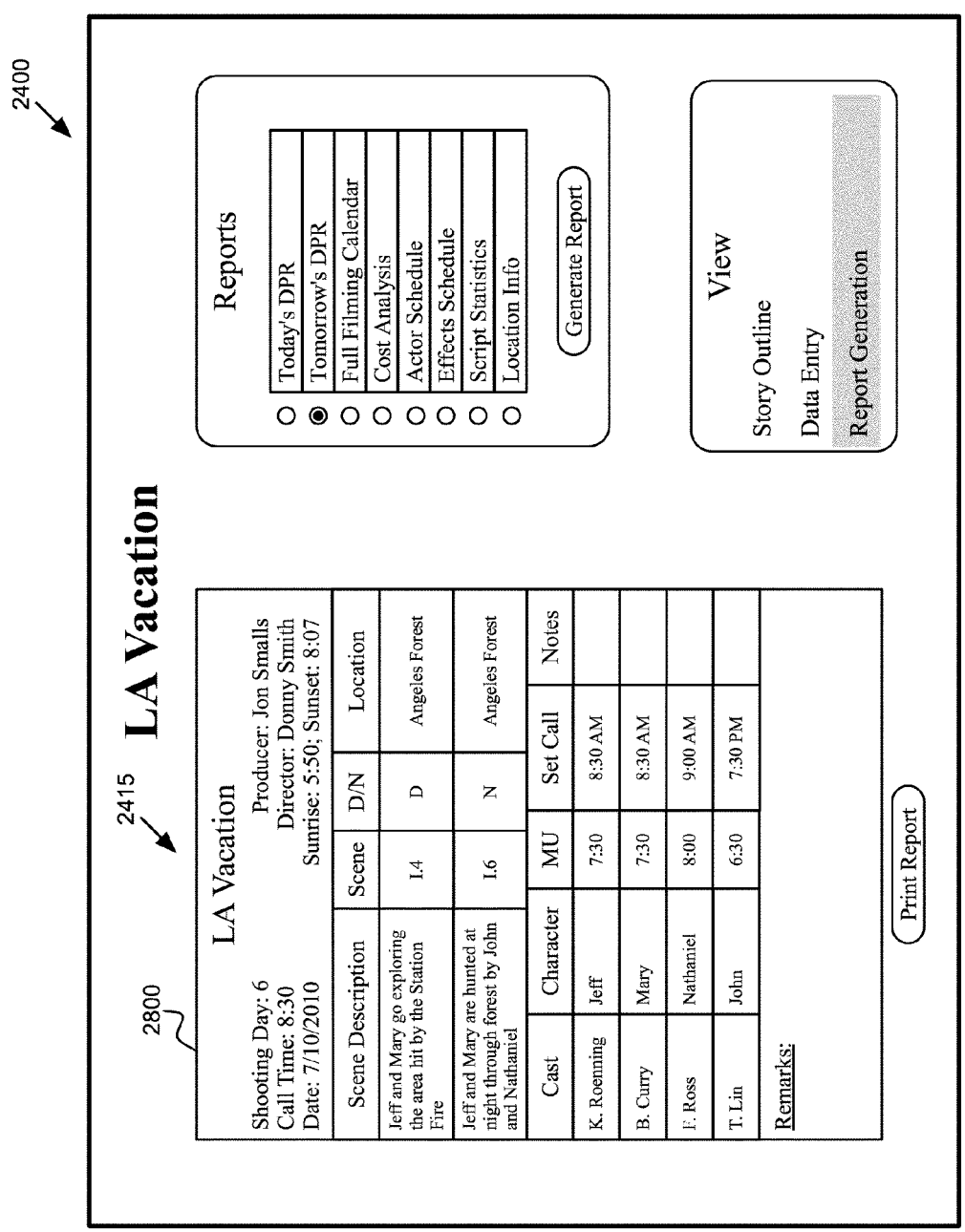
FIG. 28 illustrates an example of a daily production report displayed in the reports display area of the GUI of FIG. 24.

The report display area 2415 displays a selected report once the media production application generates the report. Examples of generated reports are shown in FIGS. 26 and 28, described below. Below the report display area 2415 is a "Print Report" selectable item 2420, that allows a user to print the generated report displayed in the report display area 2415.

The above description introduced a number of different reports. The following two sub-sections will now describe in further detail how two of these reports are generated and the information contained in each of the two reports.

A. Production Calendar

Figure 25:
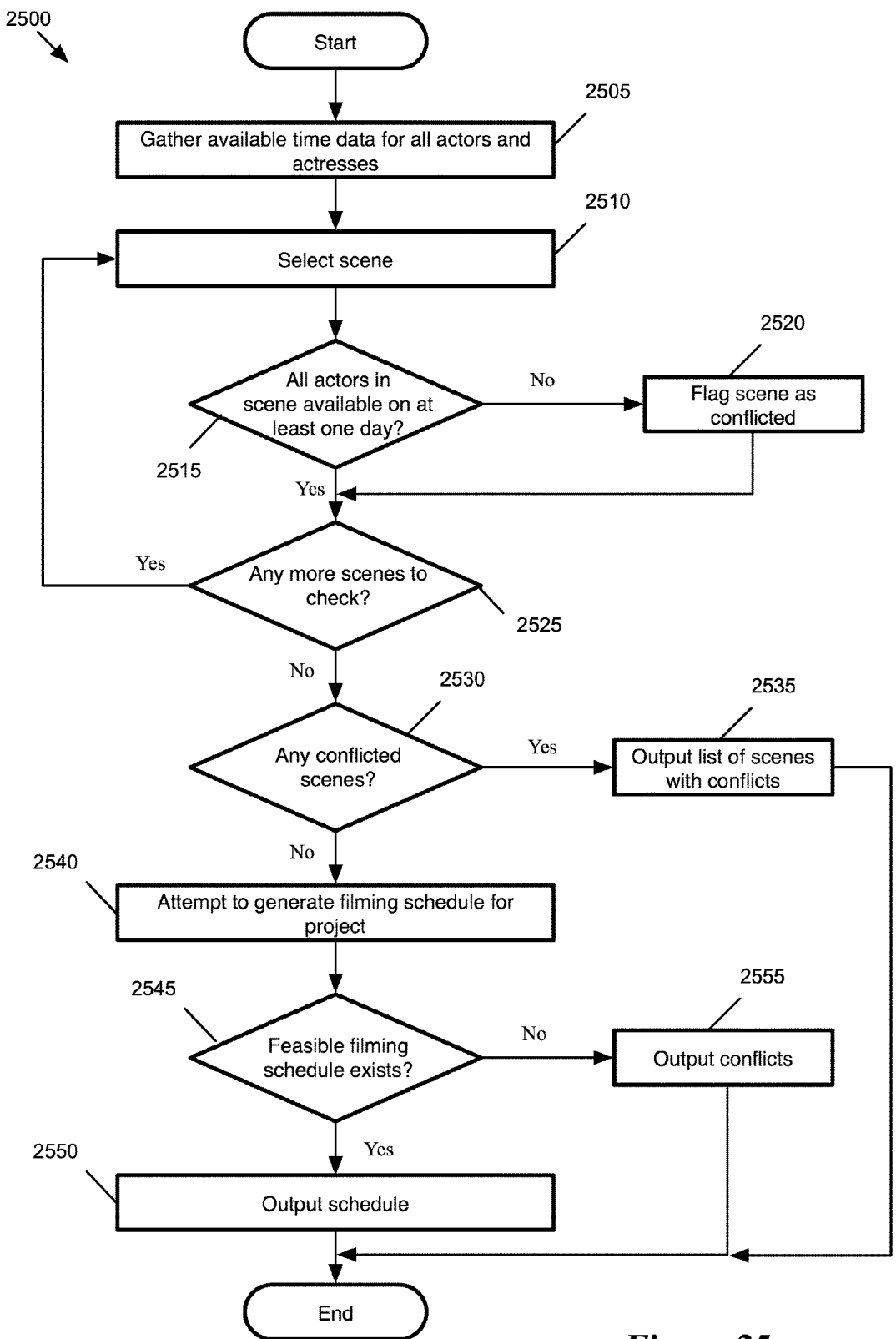
FIG. 25 conceptually illustrates a process of some embodiments for generating a filming schedule for a media production.

As shown in FIG. 24, one of the report options in some embodiments is a full filming schedule. Such a filming schedule maps out a plan for filming all of the scenes of a media production given the constraints of location and actor schedules. FIG. 25 conceptually illustrates a process 2500 of some embodiments for generating a filming schedule for a media production. In some embodiments, this process is initiated when a user selects to have a filming schedule generated. Some embodiments also initiate this process is a filming schedule is not yet generated and any other schedule is requested.

As shown, the process begins by gathering (at 2505) available time data for all actors and actresses involved in the production of the media project. In some embodiments, this entails accessing all of the cast data structures (e.g., data structure 1310) and storing the times the various cast members are available in a temporary data structure (e.g., in random access memory). Other embodiments do not specifically perform an operation to gather the availability information up front, but rather access the cast data structures as necessary during the scheduling.

The first portion of the scheduling process 2500 is a determination whether all scenes can potentially be filmed. The process selects (at 2510) a scene of the media project. Some embodiments select the scenes in chronological order within the project (i.e., starting with Act I, Scene 1), while other embodiments select the scenes in a random order.

Next, the process 2500 determines (at 2515) whether all cast members in the selected scene are available on at least one day. Some embodiments access the data structure for the selected scene and identify all of the characters in the selected scene, and from the data structures for these characters, the actors that are required for the selected scene. The cast members' availabilities are then checked against each other to identify whether there is at least one day when all of the actors and actresses required for the scene are available.

When there is no day during which all of the required cast members are available, the process flags (at 2520) the scene as conflicted. This flag may be appended to the data structure for the scene in some embodiments, or may be stored in temporary memory (e.g., random access memory).

The process 2500 then determines (at 2525) whether there are any more scenes to check for conflicts. When there are more scenes, the process returns to 2510 to select the next scene. Once all of the scenes have been checked, the process determines (at 2530) whether there are any conflicted scenes. That is, the process determines whether any scenes were flagged at 2520 for having a conflict.

When at least one conflicted scene exists, the process does not determine a filming schedule for the media project. Instead, the process outputs (at 2535) a list of the scenes that have conflicts. Some embodiments also indicate the source of the conflict (i.e., any pairs of actors required for the scene that do not share an available day. This allows the producers of the media project to either restructure the script (e.g., rewrite a scene without a particular character) or contact the actors to attempt to alleviate the conflict(s).

When there are no scenes with cast conflicts, the process attempts (at 2540) to generate a filming schedule for the media project. This involves identifying a location or locations for each day and which scenes at the day's location will be filmed that particular day. Some embodiments begin by identifying all possible days on which each scene can be filmed, given the actors, locations, and props required for the scene. As noted above, some locations and props will have usage restrictions (e.g., if the location or item needs to be rented and will only be available at certain times) in addition to the availabilities of the actors. Once all possibilities are identified for each scene, some embodiments start assigning scenes that only have one possible filming day to the particular day. Once a scene is assigned to a particular day, the location of that scene is assigned to the day, and any other scenes that can be filmed on that day are assigned, up to a limit. The media production application of some embodiments also factors in whether a scene is a night scene or a day scene, and limits the scene assignment based on this as well (e.g., by not assigning too many day scenes to a single day). The media production application then attempts to fill in the remainder of the scenes around those already assigned.

The process 2500 then determines (at 2545) whether a feasible filming schedule exists (i.e., whether the attempt to generate a filming schedule at 2540 has succeeded). If a feasible schedule exists, the process outputs (at 2550) the schedule. In some embodiments, the schedule is output as a report in the report display area 2415, is saved as a PDF or word processing file, is stored within the media production application, or is printed.

On the other hand, when a feasible filming schedule cannot be generated, the process outputs (at 2555) conflicts that are detected. These conflicts may include two scenes that have to be filmed on the same day at disparate locations, a location that is unavailable on the same day as all of the actors in a scene, etc. Much like the conflicts output at 2535, this information can enable the producers of the media project to attempt to square away the conflicts, either by modifying the script, negotiating with the cast or location owners, etc.

While the above-described process is one way to generate a filming schedule, different embodiments may use variations of the process. For instance, the initial conflict check may also factor in location availability, rather than just cast availability. Even when there are some conflicts, the application will schedule as much of the filming as possible, leaving the producers of the media project to try to fill in the rest manually.

FIG. 26 illustrates an example of a filming schedule 2600 displayed in the reports display area 2415 of GUI 2400. As shown, the user has selected the full filming schedule option in the report selector 2410. The schedule 2600 is a partial schedule generated on Jul. 10, 2010, after some of the filming for the media project "LA Vacation" has already taken place. Some embodiments allow a user to input what scenes have already been filmed, and will modify the schedule as needed. The schedule 2600 indicates, for each day, the location or locations at which filming will take place, the scenes to be filmed, and any notes for the day (e.g., specific props needed, extras needed, that a particular day is the only day certain scenes can be filmed, etc.). Some embodiments generate at least some such notes automatically, such as that shown for Jul. 14, 2010, indicating that that day is the only one with a particular actress (Maria) at the particular location (Brentwood House).

B. Daily Production Report

The daily production report is a common report used in production. However, it is presently filled in entirely by hand and requires gathering significant amounts of information on a daily basis. Based on a generated filming schedule, however, a daily production report can be generated automatically by the media production application of some embodiments. If a filming schedule is not yet generated, some embodiments will perform process 2500 in order to generate the filming schedule when a daily production report is requested.

Figure 27:
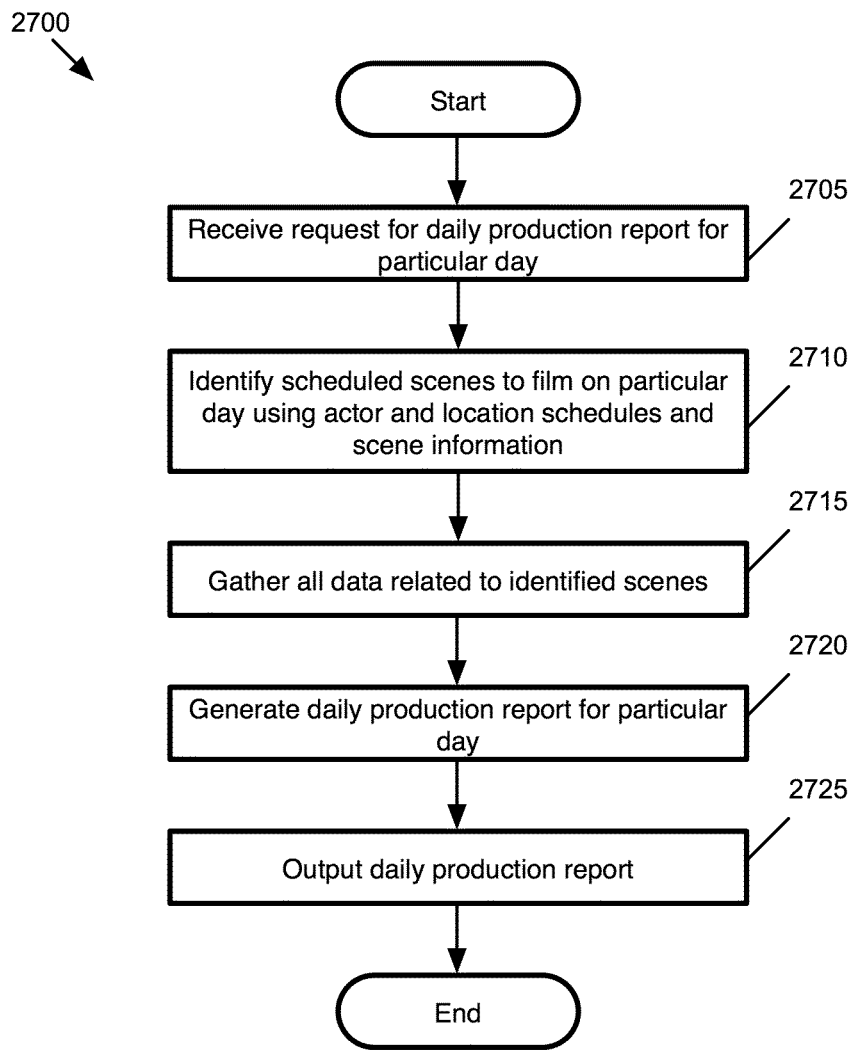
FIG. 27 conceptually illustrates a process of some embodiments for generating a daily production report for a particular day.

FIG. 27 conceptually illustrates a process 2700 of some embodiments for generating a daily production report for a particular day. As shown, the process begins by receiving (at 2705) a request for a daily production report for the particular day. In some embodiments, this request is received through user interaction with a report selector such as selector 2410 that presents various options. Some embodiments receive the request through a drop-down or similar menu. In some embodiments, when a user selects a daily production report from a list of reports or otherwise requests such a report, the user is presented with a dialog box or similar UI construct that asks the user to request a date for the daily production report. Once the date is requested, the application can generate the daily production report for the requested date.

Next, process 2700 identifies (at 2710) the scheduled scenes to film on the particular day using actor and location schedules and scene information. As mentioned, in some embodiments this entails generating an entire filming schedule, or referring to a previously generated filming schedule for the media project.

The process then gathers (at 2715) all of the data related to the identified scenes. In some embodiments, this data includes the location or locations of the scenes, the characters involved in the scenes, whether the scene is a night scene or a day scene and an interior scene or an exterior scene, the scene description, etc. Some embodiments also gather data such as the sunrise and sunset for the particular day and determine a call time for the cast and crew.

The process then generates (at 2720) a daily production report for the particular day. In some embodiments, once all of the data is gathered, the generation of the daily production report involves filling in a form with the data. The process 2700 then outputs (at 2720) the daily production report. In some embodiments, the report is output to a display area or separate window, is saved as a PDF or word processing file, is stored within the media production application, or is printed.

FIG. 28 illustrates an example of a daily production report 2800 displayed in the reports display area 2415 of GUI 2400. As shown, the user has selected the following day's daily production report option in the report selector 2410. The daily production report 2400 displays various information about the production schedule for the following day. As shown, the top portion includes various information about the project: title, director, producer, etc., that may be input into the media production application when the project is started. Also included is information about the day for which the production report is generated: that this is the sixth filming day for the project, the date, and the sunrise and sunset. In some embodiments, the media production application accesses a web site via the Internet to determine the sunrise and sunset for the day.

Next, the scene information for the different scenes to be filmed on the particular day is displayed. For each scene, the short description, the scene number, whether the scene is a day or night scene, and the location is included. Some embodiments include the cast for each scene in this region of the daily production report as well as other information (e.g., interior or exterior scene, an estimated start time for the filming of the scene, etc.).

Below the scene information the daily production report 2800 lists cast information. Each cast member that is required for a scene on the particular day is listed, along with a time that person is expected to show up for makeup and then the time he or she is expected to be on set, and any notes about the cast member for the day. The section may also include other information for each cast member, such as which scenes he or she is in for the particular day. At the bottom of the daily production report 2800 is a remarks section that can be filled in with additional information, such as information about extras, props, costumes, sets, transportation, etc.

IV. Software Architecture

Figure 29:
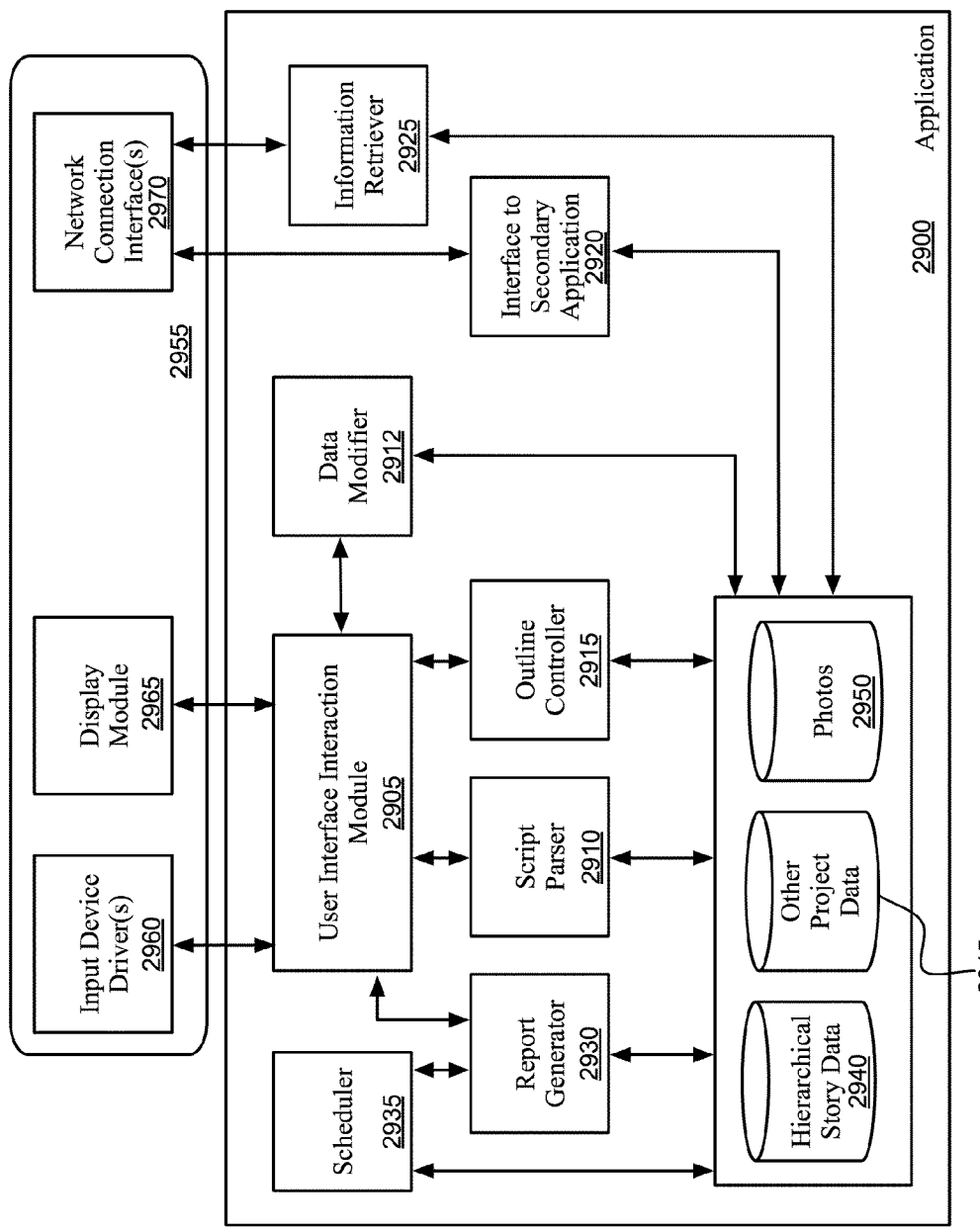
FIG. 29 conceptually illustrates the software architecture of a media production application of some embodiments.

In some embodiments, the processes described above are implemented as software running on a particular machine, such as a computer or a handheld device, or stored in a computer readable medium. FIG. 29 conceptually illustrates the software architecture of a media production application 2900 of some embodiments. In some embodiments, the media production application is a stand-alone application or is integrated into another application (e.g., a media-editing application), while in other embodiments the application might be implemented within an operating system. Furthermore, in some embodiments, the application is provided as part of a server-based solution. In some such embodiments, the application is provided via a thin client. That is, the application runs on a server while a user interacts with the application via a separate machine remote from the server. In other such embodiments, the application is provided via a thick client. That is, the application is distributed from the server to the client machine and runs on the client machine.

The media production application 2900 includes a user interface (UI) interaction module 2905, a script parser 2910, a data modifier 2912, an outline controller 2915, an interface 2920 to a secondary application, an information retriever 2925, a report generator 2930, and a scheduler 2935. The media production application also includes hierarchical story data 2940, additional project data 2945, and photos 2950. In some embodiments, the hierarchical story data 2940 stores information about the scenes, acts, and any other levels of story hierarchy that are created for a media project. The other project data 2945 stores the character, crew, cast, etc. data structures for a project, as well as any other general information about the project (e.g., title, director, producer, etc.). The photo storage 2950 stores photos that are associated with production locations for the media project. In some embodiments, the project data 2945 stores data structures for photos that include a reference to image data stored as a .jpg, .png, etc. file in photo storage 2950. In some embodiments, storages 2940-2950 are all stored in one physical storage. In other embodiments, the storages are in separate physical storages, or two of the storages are in one physical storage while the third is in a different physical storage. For instance, the hierarchical story data and the rest of the project data will often not actually be separated.

FIG. 29 also illustrates an operating system 2955 that includes input device driver(s) 2960, display module 2965, and network connection interface(s) 2970. In some embodiments, as illustrated, the device drivers 2960, display module 2965, and network connection interfaces are part of the operating system 2955 even when the media production application is an application separate from the operating system.

The input device drivers 2960 may include drivers for translating signals from a keyboard, mouse, touchpad, tablet, touchscreen, etc. A user interacts with one or more of these input device, which send signals to their corresponding device driver. The device driver then translates the signals into user input data that is provided to the UI interaction module 2960.

The present application describes a graphical user interface that provides users with numerous ways to perform different sets of operations and functionalities. In some embodiments, these operations and functionalities are performed based on different commands that are received from users through different input devices (e.g., keyboard, track pad, touchpad, mouse, etc.). For example, the present application describes the use of a cursor in the graphical user interface to control (e.g., select, move) objects in the graphical user interface. However, in some embodiments, objects in the graphical user interface can also be controlled or manipulated through other controls, such as touch control. In some embodiments, touch control is implemented through an input device that can detect the presence and location of touch on a display of the device. An example of such a device is a touch screen device. In some embodiments, with touch control, a user can directly manipulate objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

The display module 2965 translates the output of a user interface for a display device. That is, the display module 2965 receives signals (e.g., from the UI interaction module 2905) describing what should be displayed and translates these signals into pixel information that is sent to the display device. The display device may be an LCD, plasma screen, CRT monitor, touchscreen, etc.

The network connection interfaces 2970 enable the device on which the media production application 2900 operates to communicate with other devices (e.g., a device on which a secondary application is operating) through one or more networks. The networks may include wireless voice and data networks such as GSM and UMTS, 802.11 networks, wired networks such as ethernet connections, etc.

The UI interaction module 2905 of media production application 2900 interprets the user input data received from the input device drivers and passes it to various modules, including the script parser 2910, data modifier 2912, outline controller 2915, and report generator 2930. The UI interaction module also manages the display of the UI, and outputs this display information to the display module 2965. This UI display information may be based on information from the report generator 2930, outline controller 2915, etc., or directly from input data (e.g., when a user moves an item in the UI that does not affect any of the other modules of the application 2900).

The script parser 2910 receives a script (e.g., as text entered through the UI module, or as a text file, word processing file, etc.), and parses the script to extract information. As described above by reference to FIG. 2, some embodiments parse a script to identify scene (or other story hierarchy level) and character information, and associate the characters and scenes. The script parser stores this information in the data storages 2940 and 2945.

The data modifier 2912 receives user input (e.g., through a data entry form displayed by the UI interaction module 2905) and creates and/or modifies data structures stored in the storages 2940 and 2945. For instance, when a user enters in information about a location, cast member, crew member, etc., data structures for these entities are either created or modified in the storages 2940 and 2945 by the data modifier 2912.

The outline controller 2915 generates the project outline, such as that illustrated in FIG. 16, using data from the storages 2940-2950. The project outline is sent to the UI interaction module 2905 for incorporation into the user interface for display. The outline controller also receives user input to manipulate or modify the outline (e.g., move scenes around, scroll through the outline, view scene details, etc.) and performs these functions. When scenes are moved, some embodiments also modify the corresponding data structures in the storages 2940-2950.

The interface 2920 to the secondary application enables the primary production application 2900 to communicate with a secondary application such as that described by reference to FIG. 5. The secondary application may be used to capture photos of production locations, tag the photos with geolocation coordinates and a location name, and upload the photo information to the primary production application. The interface 2920 is able to connect with the secondary application through the network communication interfaces 2970. As discussed above, some embodiments require the secondary application to sign in to the primary application 2900 in order to exchange data with the primary application.

In some embodiments, the information retriever 2925 is similar to the information retriever 535 described above by reference to FIG. 5. The information retriever 2925 uses geolocation coordinates or address information for a production location to search for information about the location that is available on the Internet. This information may include fire and rescue services information, hotel and food information, the production house closest to the location, maps, etc. The information retriever 2925 connects to the Internet through the network connection interfaces 2970. The information retriever of some embodiments is configured to search specific websites (e.g., Yahoo®, Bing®, Google®, etc.) for this information.

The report generator 2930 generates custom or default reports according to information received from user devices through the UI interaction module 2905. The report generator uses the scheduler 2935 (described immediately below) to determine any necessary schedules for a report (e.g., an actor schedule, a daily production report, etc.). The report generator also retrieves any required data to enter into a report from the storages 2940-2950. Generated reports are passed to the UI interaction module 2905 in some embodiments so that the report can be displayed for the user in the UI. Some embodiments also store the generated reports in the storage 2945.

The scheduler 2935 attempts to generate a production schedule for a media project based on the project data stored in the storages 2940 and 2945. In some embodiments, the scheduler performs process 2500 or a similar process in order to determine a production schedule. The scheduler identifies conflicts and assigns scenes to days on which the scenes will be filmed. Some embodiments store this schedule in the project data 2945. The schedule can also be sent to the report generator for output or for use in determining a more particular report.

While many of the features have been described as being performed by one module (e.g., the report generator 2930, the script parser 2910, etc.), one of ordinary skill in the art will recognize that the functions described herein might be split up into multiple modules. Similarly, functions described as being performed by multiple different modules might be performed by a single module in some embodiments (e.g., the scheduling and report generation functions).

V. Process for Defining a Media Production Application

Figure 30:
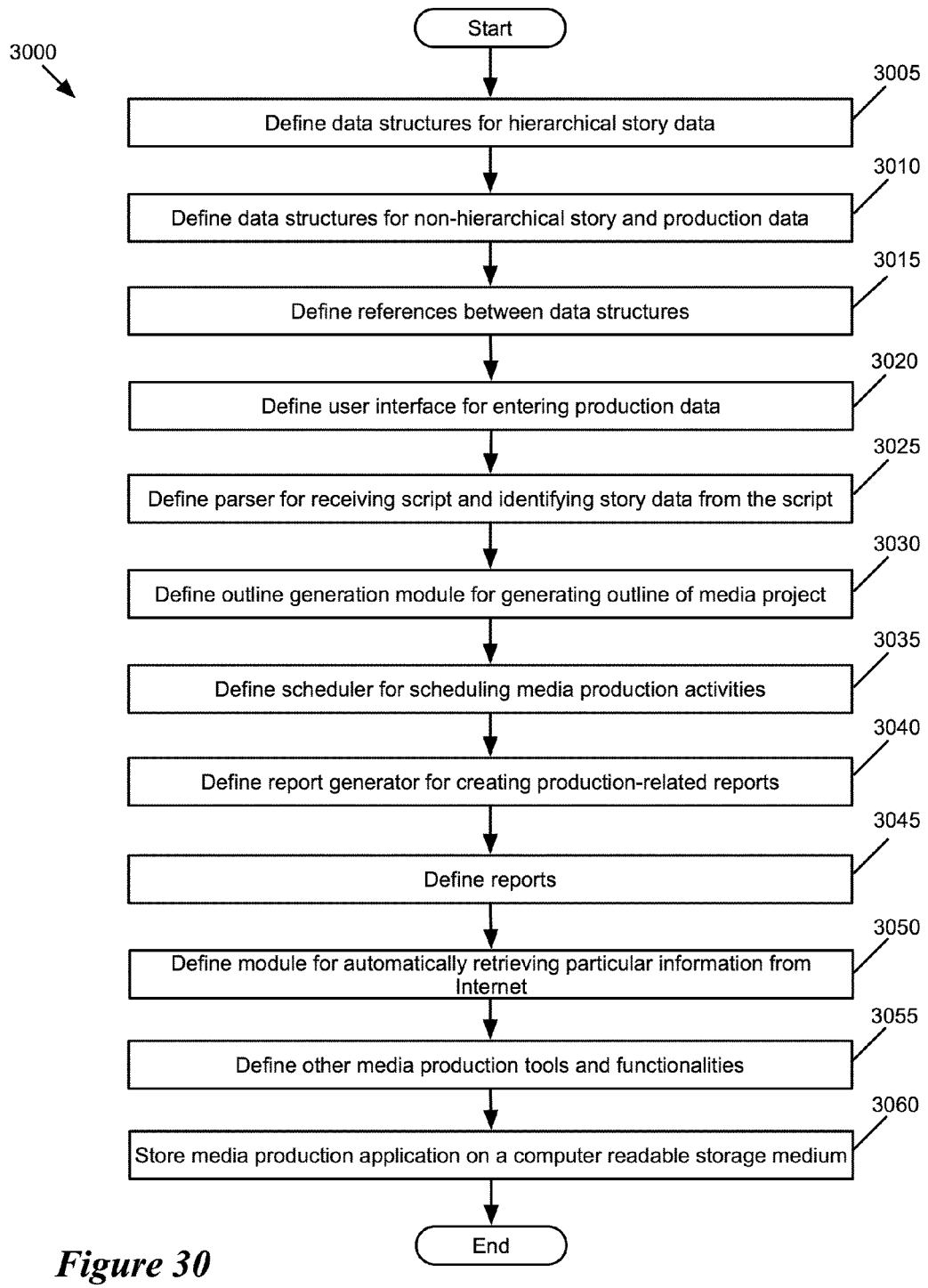
FIG. 30 conceptually illustrates a process of some embodiments for manufacturing a computer readable medium that stores a media production application such as the application described above.

FIG. 30 conceptually illustrates a process 3000 of some embodiments for manufacturing a computer readable medium that stores a media production application such as the application 2900 described above. In some embodiments, the computer readable medium is a distributable CD-ROM. As shown, the process 3000 begins by defining (at 3005) data structures for hierarchical story data. For instance, data structures for scenes as shown in FIG. 12 are examples of such hierarchical story data structures. The process next defines (at 3010) data structures for non-hierarchical story and production data, such as the character and actor data structures illustrated in FIG. 13. the process then defines (at 3015) references between the data structures. An example of such references are those between the character and actor data structures illustrated in FIG. 13.

Next, the process 3000 defines (at 3020) a user interface for entering production data. For instance, FIGS. 9 and 10 illustrate a user interface 900 with data entry forms for entering data. The process then defines (at 3025) a parser for receiving a script and identifying story data from the script, The script parser 2910 of FIG. 29 is an example of such a parser. The process next defines (at 3030) an outline generation module for generating an outline of a media project, such as outline controller 2915.

The process 3000 defines (at 3035) a scheduler for scheduling media production activities using data about a media project, such as the scheduler 2935. The process then defines (at 3040) a report generator for creating production-related reports. Report generator 2930 is an example of such a module. The process then defines (at 3045) reports to be generated, such as a calendar, daily production report, actor schedule, etc.

Next, the process 3000 defines (at 3050) a module for automatically retrieving particular information from the Internet, such as the information retriever 2925. The process defines (at 3055) other media production tools and functionalities. In some embodiments, this includes various media-editing functionalities for use in editing the media project after filming.

The process then stores (at 3060) the media production application on a computer readable storage medium. As mentioned above, in some embodiments the computer readable storage medium is a distributable CD-ROM. In some embodiments, the medium is one or more of a solid-state device, a hard disk, a CD-ROM, or other non-volatile computer readable storage medium.

One of ordinary skill in the art will recognize that the various elements defined by process 6900 are not exhaustive of the modules, rules, processes, and UI items that could be defined and stored on a computer readable storage medium for a media production application incorporating some embodiments of the invention. In addition, the process 3000 is a conceptual process, and the actual implementations may vary. For example, different embodiments may define the various elements in a different order, may define several elements in one operation, may decompose the definition of a single element into multiple operations, etc. In addition, the process 3000 may be implemented as several sub-processes or combined with other operations within a macro-process.

VI. Computer System

Many of the above-described features and applications are implemented as software processes that are specified as a set of instructions recorded on a computer readable storage medium (also referred to as computer readable medium). When these instructions are executed by one or more computational element(s) (such as processors or other computational elements like ASICs and FPGAs), they cause the computational element(s) to perform the actions indicated in the instructions. Computer is meant in its broadest sense, and can include any electronic device with a processor. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs when installed to operate on one or more computer systems define one or more specific machine implementations that execute and perform the operations of the software programs.

Figure 31:
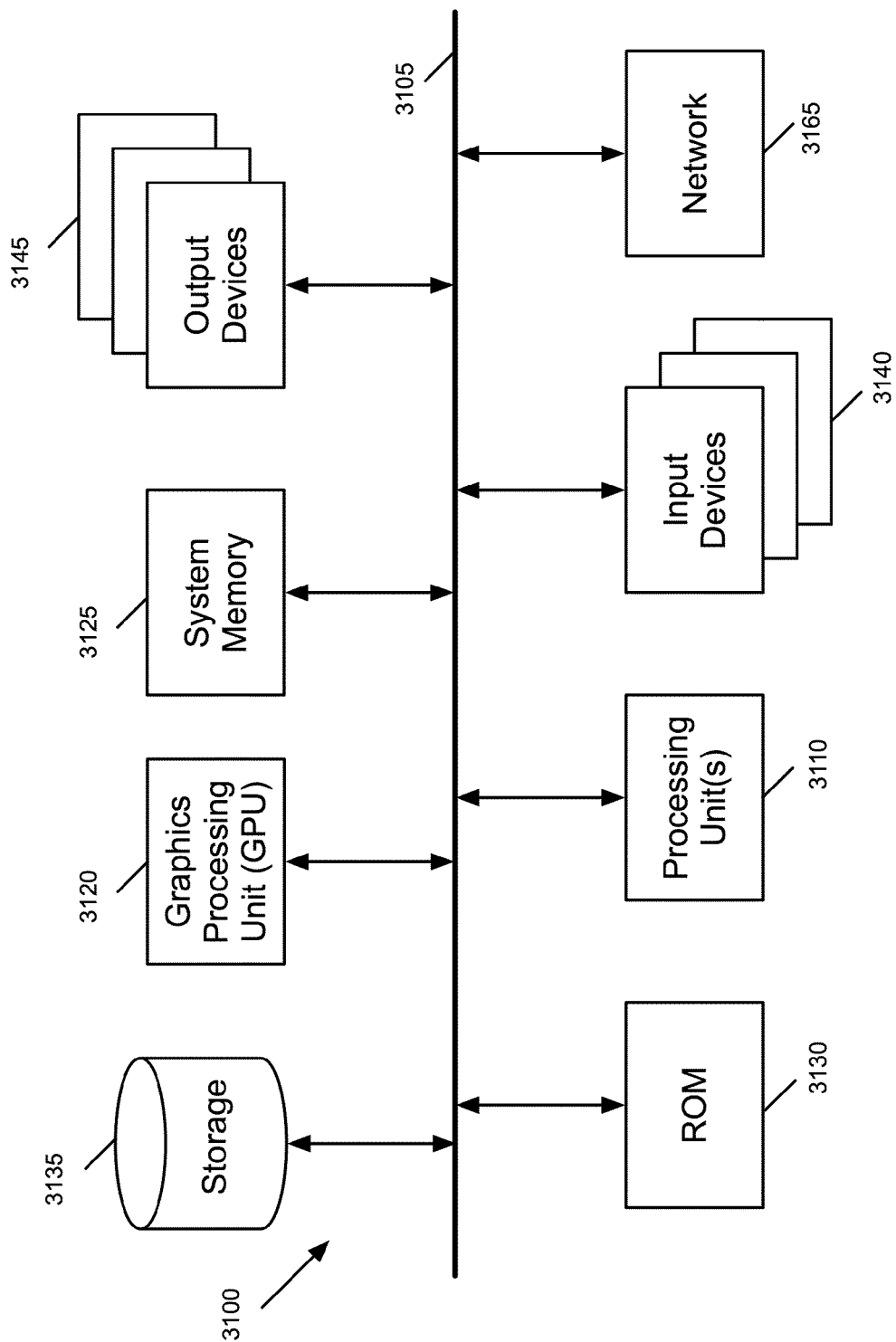
FIG. 31 conceptually illustrates a computer system with which some embodiments of the invention are implemented.

FIG. 31 conceptually illustrates a computer system with which some embodiments of the invention are implemented. Such a computer system includes various types of computer readable media and interfaces for various other types of computer readable media. One of ordinary skill in the art will also note that the digital video camera of some embodiments also includes various types of computer readable media. Computer system 3100 includes a bus 3105, processing unit(s) 3110, a graphics processing unit (GPU) 3120, a system memory 3125, a read-only memory 3130, a permanent storage device 3135, input devices 3140, and output devices 3145.

The bus 3105 collectively represents all system, peripheral, and chipset buses that communicatively connect the numerous internal devices of the computer system 3100. For instance, the bus 3105 communicatively connects the processing unit(s) 3110 with the read-only memory 3130, the GPU 3120, the system memory 3125, and the permanent storage device 3135.

From these various memory units, the processing unit(s) 3110 retrieve instructions to execute and data to process in order to execute the processes of the invention. The processing unit(s) may be a single processor or a multi-core processor in different embodiments. While the discussion in this section primarily refers to software executed by a microprocessor or multi-core processor, in some embodiments the processing unit(s) include a Field Programmable Gate Array (FPGA), an ASIC, or various other electronic components for executing instructions that are stored on the processor.

Some instructions are passed to and executed by the GPU 3120. The GPU 3120 can offload various computations or complement the image processing provided by the processing unit(s) 3110. In some embodiments, such functionality can be provided using CoreImage's kernel shading language.

The read-only-memory (ROM) 3130 stores static data and instructions that are needed by the processing unit(s) 3110 and other modules of the computer system. The permanent storage device 3135, on the other hand, is a read-and-write memory device. This device is a non-volatile memory unit that stores instructions and data even when the computer system 3100 is off. Some embodiments of the invention use a mass-storage device (such as a magnetic or optical disk and its corresponding disk drive) as the permanent storage device 3135.

Other embodiments use a removable storage device (such as a floppy disk, flash drive, or ZIP® disk, and its corresponding disk drive) as the permanent storage device. Like the permanent storage device 3135, the system memory 3125 is a read-and-write memory device. However, unlike storage device 3135, the system memory is a volatile read-and-write memory, such a random access memory. The system memory stores some of the instructions and data that the processor needs at runtime. In some embodiments, the invention's processes are stored in the system memory 3125, the permanent storage device 3135, and/or the read-only memory 3130. For example, the various memory units include instructions for processing multimedia items in accordance with some embodiments. From these various memory units, the processing unit(s) 3110 retrieve instructions to execute and data to process in order to execute the processes of some embodiments.

The bus 3105 also connects to the input and output devices 3140 and 3145. The input devices enable the user to communicate information and select commands to the computer system. The input devices 3140 include alphanumeric keyboards and pointing devices (also called "cursor control devices"). The output devices 3145 display images generated by the computer system. The output devices include printers and display devices, such as cathode ray tubes (CRT) or liquid crystal displays (LCD).

Finally, as shown in FIG. 31, bus 3105 also couples computer 3100 to a network 3165 through a network adapter (not shown). In this manner, the computer can be a part of a network of computers (such as a local area network ("LAN"), a wide area network ("WAN"), or an Intranet, or a network of networks, such as the internet. Any or all components of computer system 3100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processor and includes sets of instructions for performing various operations. Examples of hardware devices configured to store and execute sets of instructions include, but are not limited to application specific integrated circuits (ASICs), field programmable gate arrays (FPGA), programmable logic devices (PLDs), ROM, and RAM devices. Examples of computer programs or computer code include machine code, such as is produced by a compiler, and files including higher-level code that are executed by a computer, an electronic component, or a microprocessor using an interpreter.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 1, 3, 4, 6, 8, 11, 23, 25, 27, and 30) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

The invention claimed is:

1. A non-transitory machine readable medium storing a program for execution by at least one processing unit, the program comprising sets of instructions for:

receiving a script of a media project, the script having a particular format that specifies data for different media production categories differently;

automatically parsing the script to identify (i) story sections of the media project and (ii) characters in the media project based on data specified in the particular format in the received script, wherein the story sections and characters are different media production categories specified in the received script for the media project;

automatically creating data structures for the story sections and the characters identified by automatically parsing the script;

automatically creating associations between the identified story sections and the identified characters in the created data structures based on data in the received script; and using the created data structures and associations to automatically schedule production of the media project.

2. A computer-implemented method for managing production of a media project, the method comprising:

receiving a script of a media project, the script having a particular format that specifies data for different media production categories differently;

automatically parsing the script to identify (i) story sections of the media project and (ii) characters in the media project based on data specified in the particular format in the received script, wherein the story sections and characters are different media production categories specified in the received script for the media project;

automatically creating data structures for the story sections and the characters identified by automatically parsing the script; and automatically creating associations between the identified story sections and the identified characters in the created data structures based on data in the received script; and using the created data structures and associations to automatically schedule production of the media project.

3. A system comprising:

a set of processing units; and a non-transitory machine readable medium storing a program for execution by at least one processing unit, the program for managing production of a media project, the program comprising sets of instructions for:

receiving a script of a media project, the script having a particular format that specifies data for different media production categories differently;

automatically parsing the script to identify (i) story sections of the media project and (ii) characters in the media project based on data specified in the particular format in the received script, wherein the story sections and characters are different media production categories specified in the received script for the media project;

automatically creating data structures for the story sections and the characters identified by automatically parsing the script; and automatically creating associations between the identified story sections and the identified characters in the created data structures based on data in the received script; and using the created data structures and associations to automatically schedule production of the media project.

4. The non-transitory machine readable medium of claim 1, wherein the media project is a film and the story sections are scenes of the film.

5. The non-transitory machine readable medium of claim 1, wherein the set of instructions for automatically parsing the script based on the data specified in the particular format in the received script comprises sets of instructions for:

identifying each story section of the media project from a header in the script for the story section; and identifying each character in the script from a formatting of the character's name, wherein the set of instructions for creating the data structures comprises sets of instructions for creating a separate data structure for each identified story section and each identified character.

6. The non-transitory machine readable medium of claim 1, wherein the set of instructions for creating associations between the identified story sections and the identified characters in the data structures comprises a set of instructions for creating, in the data structure for a particular character, a reference to each story section in which the particular character is featured.

7. The non-transitory machine readable medium of claim 1, wherein the set of instructions for using the data structures and associations to automatically schedule production of the media project comprises a set of instructions for identifying actors required for filming each story section based on (i) characters associated with the story section and (ii) actors associated with the characters.

8. The non-transitory machine readable medium of claim 1, wherein the program further comprises sets of instructions for:

receiving a plurality of data regarding locations at which each of the story sections will be filmed for the media project;

for each location at which one or more story sections will be filmed, receiving a photo of the location; and displaying a graphical outline of the media project in which each story section is represented by a thumbnail of the photo of the location at which the story section will be filmed.

9. The method of claim 2 further comprising:

receiving a plurality of data regarding locations at which each of the story sections will be filmed for the media project;

for each location at which one or more story sections will be filmed, receiving a photo of the location; and displaying a graphical outline of the media project in which each story section is represented by a thumbnail of the photo of the location at which the story section will be filmed.

10. The method of claim 9, wherein each thumbnail is a selectable item.

11. The method of claim 10, wherein the selectable items are moveable by a user to rearrange sections of the media project.

12. The method of claim 9, wherein the graphical outline further includes, for each story section, information about the filming of the story section.

13. The system of claim 3, wherein the media project is a film and the story sections are scenes of the film.

14. The system of claim 3, wherein the set of instructions for automatically parsing the script based on the data specified in the particular format in the received script comprises sets of instructions for:

identifying each story section of the media project from a header in the script for the story section; and identifying each character in the script from a formatting of the character's name, wherein the set of instructions for creating the data structures comprises sets of instructions for creating a separate data structure for each identified story section and each identified character.

15. The system of claim 3, wherein the set of instructions for creating associations between the identified story sections and the identified characters in the data structures comprises a set of instructions for creating, in the data structure for a particular character, a reference to each story section in which the particular character is featured.

16. The system of claim 3, wherein the set of instructions for using the data structures and associations to automatically schedule production of the media project comprises a set of instructions for identifying actors required for filming each story section based on (i) characters associated with the story section and (ii) actors associated with the characters.

17. The system of claim 3, wherein the program further comprises sets of instructions for:

receiving a plurality of data regarding locations at which each of the story sections will be filmed for the media project;

for each location at which one or more story sections will be filmed, receiving a photo of the location; and displaying a graphical outline of the media project in which each story section is represented by a thumbnail of the photo of the location at which the story section will be filmed.

18. The non-transitory machine readable medium of claim 8, wherein each thumbnail is a selectable item.

19. The non-transitory machine readable medium of claim 18, wherein the selectable items are moveable by a user to rearrange sections of the media project.

20. The non-transitory machine readable medium of claim 8, wherein the graphical outline further includes, for each story section, information about the filming of the story section.

* * * * *